(12) United States Patent
Bonetti et al.

(10) Patent No.: US 12,352,555 B2
(45) Date of Patent: Jul. 8, 2025

(54) THREE-DIMENSIONAL OPTICAL MEASURING MOBILE APPARATUS FOR ROPES WITH ROPE ATTACHMENT DEVICE

(71) Applicant: BRIDON INTERNATIONAL LTD., Doncaster (GB)

(72) Inventors: Cristiano Bonetti, Doncaster (GB); Bart Vanlandeghem, Kruisem (BE); Christopher John Newton, Banbury (GB)

(73) Assignee: Bridon International Ltd., Doncaster (GB)

( * ) Notice: Subject to any disclaimer, the term of this patent is extended or adjusted under 35 U.S.C. 154(b) by 455 days.

(21) Appl. No.: 17/759,053

(22) PCT Filed: Jan. 21, 2021

(86) PCT No.: PCT/IB2021/050445
§ 371 (c)(1),
(2) Date: Jul. 19, 2022

(87) PCT Pub. No.: WO2021/148971
PCT Pub. Date: Jul. 29, 2021

(65) Prior Publication Data
US 2023/0040446 A1 Feb. 9, 2023

(30) Foreign Application Priority Data
Jan. 21, 2020 (IT) .................. 102020000001057

(51) Int. Cl.
*G01B 11/10* (2006.01)
*G01B 11/24* (2006.01)
(Continued)

(52) U.S. Cl.
CPC ........ *G01B 11/105* (2013.01); *G01B 11/2408* (2013.01); *G01B 21/042* (2013.01); *G01N 21/952* (2013.01)

(58) Field of Classification Search
CPC .............. G03B 37/005; B65H 75/4405; G01N 21/954; G01N 21/8851; G01N 21/95;
(Continued)

(56) References Cited

U.S. PATENT DOCUMENTS 11,994,475 B2 * 5/2024 Hall .................. F16L 37/0885
2005/0088515 A1   4/2005 Geng
(Continued)

FOREIGN PATENT DOCUMENTS

CN   107121079 A     9/2017
CN   105633577 B  *  1/2019  ............ G01D 21/02
(Continued)

OTHER PUBLICATIONS

Chilean Search Report for Chilean Patent Application No. 202201981, mailed Nov. 15, 2023, 4 pages.
(Continued)

*Primary Examiner* — Dung Hong
(74) *Attorney, Agent, or Firm* — Armstrong Teasdale LLP

(57) ABSTRACT

A calibrated three-dimensional optical measuring apparatus for the three-dimensional measurement of geometric parameters of a rope has a frame defining and arranged around a rope receiving cavity. A plurality of image acquisition devices is configured to acquire a plurality of digital images of at least one region of an outer surface of the rope. The image acquisition devices are fixed to the frame and arranged around the rope when the calibrated three-dimensional optical measuring apparatus receives the rope in the rope receiving cavity. An attachment device is configured to constrain the calibrated three-dimensional optical measuring
(Continued)

apparatus to the rope in a relatively translatable manner with respect to the rope. An electronic digital image processing device is configured to process a multiplicity of digital images and obtain a three-dimensional photogrammetric reconstruction of points of the digital images of the rope acquired by the image acquisition devices.

18 Claims, 17 Drawing Sheets

(51) Int. Cl.
  *G01B 21/04* (2006.01)
  *G01N 21/952* (2006.01)
(58) Field of Classification Search
  CPC ............... G01N 21/952; G01B 11/105; G01B 11/2408; G01B 21/042
  See application file for complete search history.

(56) References Cited

U.S. PATENT DOCUMENTS

| | | | |
|---|---|---|---|
| 2006/0062449 A1 | 3/2006 | Pratt | |
| 2009/0217954 A1* | 9/2009 | Hall | G01B 11/245 |
| | | | 134/115 R |
| 2011/0268313 A1 | 11/2011 | Winter et al. | |
| 2013/0135450 A1* | 5/2013 | Pallone | A61B 5/0091 |
| | | | 348/50 |
| 2015/0346115 A1 | 12/2015 | Seibel | |
| 2016/0161436 A1* | 6/2016 | Marashdeh | G01R 27/2623 |
| | | | 324/681 |
| 2018/0348116 A1* | 12/2018 | Keightley | G01B 11/24 |
| 2020/0003549 A1 | 1/2020 | Nota et al. | |
| 2020/0156075 A1* | 5/2020 | Enck | G01N 35/00613 |
| 2023/0088414 A1* | 3/2023 | Toni | G06V 20/53 |
| | | | 382/103 |
| 2024/0159786 A1* | 5/2024 | Chang | G01N 35/02 |

FOREIGN PATENT DOCUMENTS

| | | | | |
|---|---|---|---|---|
| CN | 208705273 U | * | 4/2019 | ......... G01N 21/8851 |
| EP | 2383566 A1 | | 11/2011 | |
| JP | 2012163402 A | * | 8/2012 | |

OTHER PUBLICATIONS

International Search Report and Written Opinion for International Patent Application No. PCT/IB2021/050445, mailed Apr. 21, 2021, 12 pages.

Grzegorz Olszyna et al., Assessment of the condition of Hoisting Ropees by Measuring their Geometric Parameters in a Three-dimensional Image of their Surface, Archives of Mining Sciences, Sep. 1, 2013, pp. 643-654, vol. 58, No. 3.

Italian Search Report for Italian Patent Application No. 102020000001057, mailed Oct. 22, 2020, 12 pages.

* cited by examiner

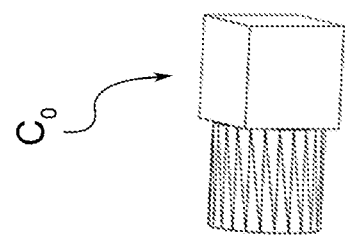
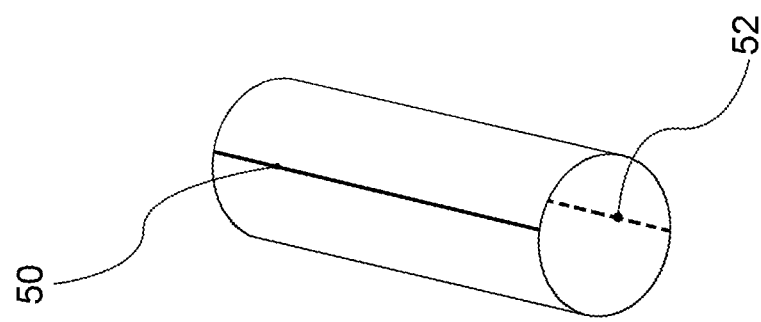
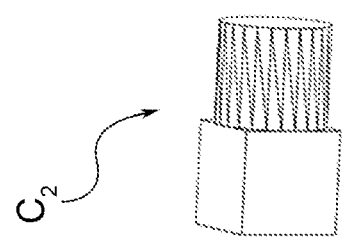
FIG. 9

THREE-DIMENSIONAL OPTICAL MEASURING MOBILE APPARATUS FOR ROPES WITH ROPE ATTACHMENT DEVICE

CROSS-REFERENCE TO RELATED APPLICATIONS

This application is a National Stage Application of International Patent Application No. PCT/IB2021/050445, having an International Filing Date of Jan. 21, 2021, which claims priority to Italian Patent Application No. 102020000001057, filed Jan. 21, 2020, the entire contents of each of which are incorporated by reference herein.

FIELD OF THE INVENTION

The present invention generally lies within the measurement and inspection systems of stationary or moving ropes or cables, with non-destructive and non-contact techniques.

In particular, the present invention relates to a calibrated three-dimensional optical measuring apparatus and to a method for the three-dimensional optical measurement of geometric parameters of a rope, through the acquisition of digital images of the outer surface of the rope or cable. Application examples of such a method concern the continuous measurement of ropes or cables, otherwise not implementable with contact methods due to the movement of the measured object. For example, such measurements concern the inspection of ropes or cables of chairlifts and/or cable cars during the operation thereof. Furthermore, the present invention relates to the continuous measurement of ropes or cables in the production line, for quality control or periodic inspections in operation. The known measurement and inspection techniques in many cases include the presence of the operator under difficult and/or dangerous environmental conditions, such as measurements in environments contaminated by chemical agents or suspended ropes. Moreover, disadvantageously, in many cases it is necessary to stop the production or handling plants in order to perform the measurement.

BACKGROUND OF THE INVENTION

Techniques for measuring geometric parameters of ropes by processing two-dimensional (2D) images of the rope are known.

For example, EP2383566A1 describes a method for acquiring two-dimensional images of a portion of rope and measuring the extension of the strands in the 2D image; the method includes determining a quality value as a function of the longitudinal extension of the strands calculated with respect to a reference target value.

Disadvantageously, the 2D processing techniques are subject to measurement errors due to the perspective localization between rope and camera.

Furthermore, in the event of particularly dirty ropes or with the presence of grease, it is very difficult to obtain images which can be easily analyzed.

Techniques for measuring geometric parameters of ropes are also known through the use of cameras with linear sensors (i.e., sensors based on a single line of pixels), but such techniques, as well as being subject to errors in case of imperfect perpendicularity between the plane passing through the sensor and the rope axis, are also affected by errors due to the vibrations to which the rope is subjected during the measurement.

In particular, the systems of the prior art are often bulky, difficult to transport and are affected by the lighting conditions of the surrounding environment, which compromise the image acquisition quality.

SUMMARY OF THE INVENTION

It is the object of the present invention to provide an apparatus and a method for the three-dimensional optical measurement of geometric parameters of a rope or rigid or flexible cable, which allows to overcome the aforementioned drawbacks.

Such an object is achieved by an apparatus for the optical three-dimensional measurement of geometric parameters of a rope (or in an equivalent manner of a cable) and by a method, in accordance with the appended independent claims; the claims dependent thereon describe alternative embodiments.

Preferably, the type of ropes and cables which can be analyzed by the three-dimensional optical measuring apparatus includes both rigid and flexible ropes, made of any type of material, for example iron, steel, natural or synthetic fibers, carbon fibers and the like. In other words, rope can be understood as any axial-symmetrical object with a preferred extension dimension (the length) much greater than the other two dimensions, for example the preferred extension dimension is more than 100 times longer than the other two dimensions.

Preferably, the rope or cable has an outer surface with one or more of the following features:
  continuous or at least continuous in sections, for example smooth or with grooves on the surface;
  solid spiral e.g., spiral bars;
  consisting of one or more helical-wound sub-parts, for example spiral or stranded cables or ropes.

For example, the rope consists either of a single thread, or of several intertwined threads, which form the so-called strand, or by several intertwined strands, so that the rope consists of several threads intertwined to form single strands, the latter in turn intertwined with one another.

The rope or cable may also consist of intertwined fibers.

The calibrated three-dimensional optical measuring apparatus for measuring the geometric parameters of a rope comprises a plurality of digital image acquisition devices adapted to acquire a multiplicity of digital images of at least one region of the outer surface of the rope.

Preferably, the digital image acquisition devices are cameras with image sensors of the matrix type (i.e., which are capable of acquiring digital images on a matrix of pixels). Furthermore, the system includes a digital image processing device arranged to perform the steps of the method for measuring such geometric parameters of the rope which will be detailed in the continuation of the present document.

In summary, in an embodiment, the three-dimensional optical measuring apparatus allows to photogrammetrically reconstruct, in a three-dimensional space, a plurality of points of at least one region of the outer surface of the rope starting from corresponding points on each digital image and then to calculate the geometric parameters by means of such a plurality of three-dimensional points.

Preferably, the geometric parameters measured by the optical system concern at least one of the following measurements:
  point diameter of the rope or mean diameter of the rotating body which approximates or circumscribes the rope;

point roundness of the rope or mean roundness of the rotating body which approximates or circumscribes the rope;

position, orientation, and linearity of the axis of the rope or of the rotating body which approximates or circumscribes the rope;

length of the rope measured along the axis of the rope or cable or the rotating body which approximates or circumscribes the rope or cable;

the pitch of the rope, i.e., the distance between adjacent coils or helices for samples the outer surface of which is solid spiral or consisting of one or more helical-wound sub-parts. For example, the pitch of the rope is calculated between the coils or helices consisting of the adjacent strands or threads forming the rope.

BRIEF DESCRIPTION OF THE FIGURES

The features and advantages of the calibrated optical system and of the method for measuring geometric parameters of a rope or cable according to the present invention will become apparent from the following description, given by way of explanation and not by way of limitation, in accordance with the accompanying figures, in which:

FIG. 9 shows a detail of the representative diagram of the calibrated three-dimensional optical measuring apparatus according to an embodiment of the invention in which the contour lines of the rope common to each field of view of the pair of image acquisition systems are outlined with thicker lines, in which each digital device is arranged in a diametrically opposite position along an axis perpendicular to the rope axis;

DETAILED DESCRIPTION

Figure 1:
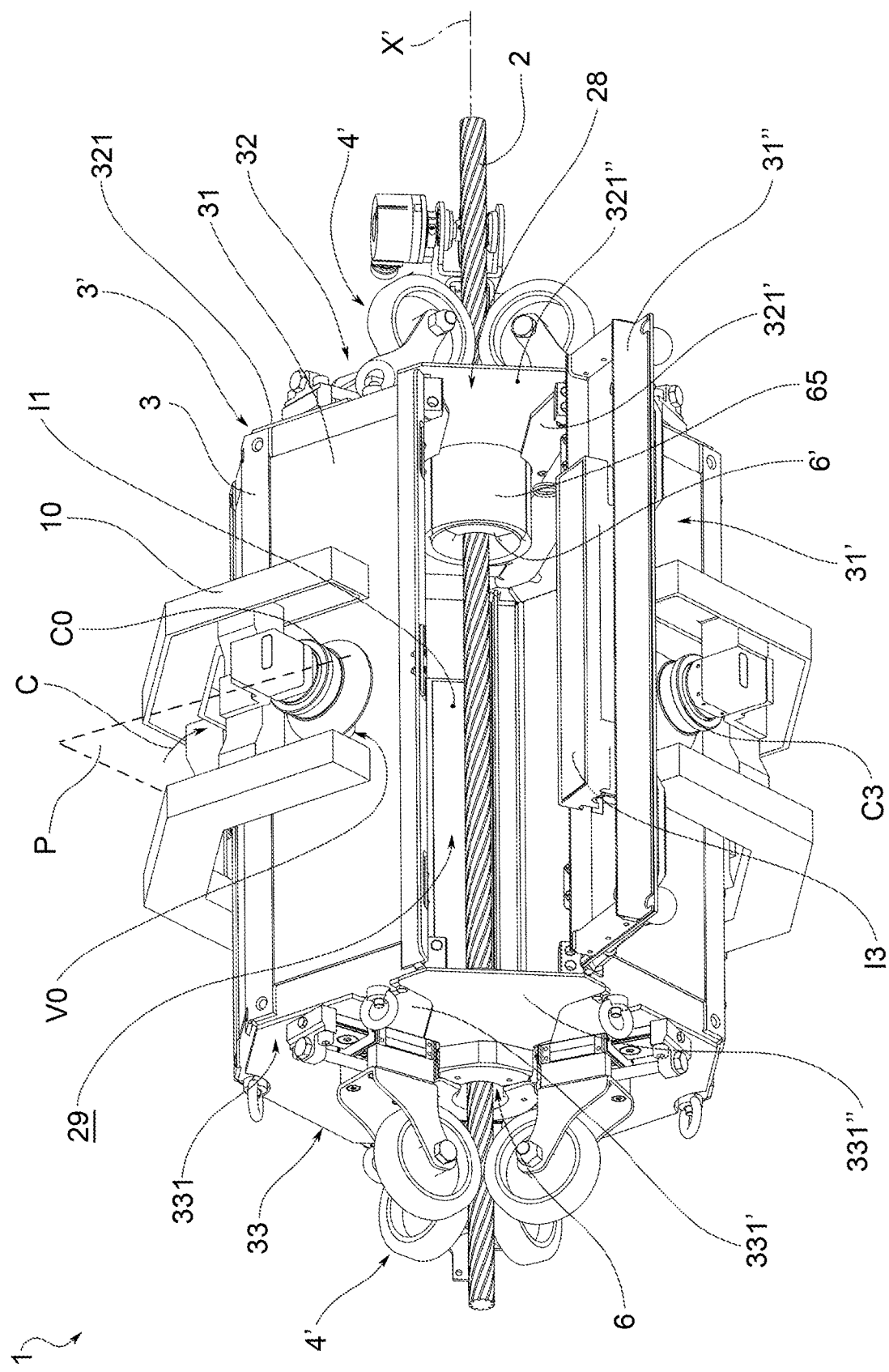
FIG. 1 shows a calibrated three-dimensional optical measuring apparatus in accordance with an embodiment according to the present invention and installed on a rope.
Figure 2:
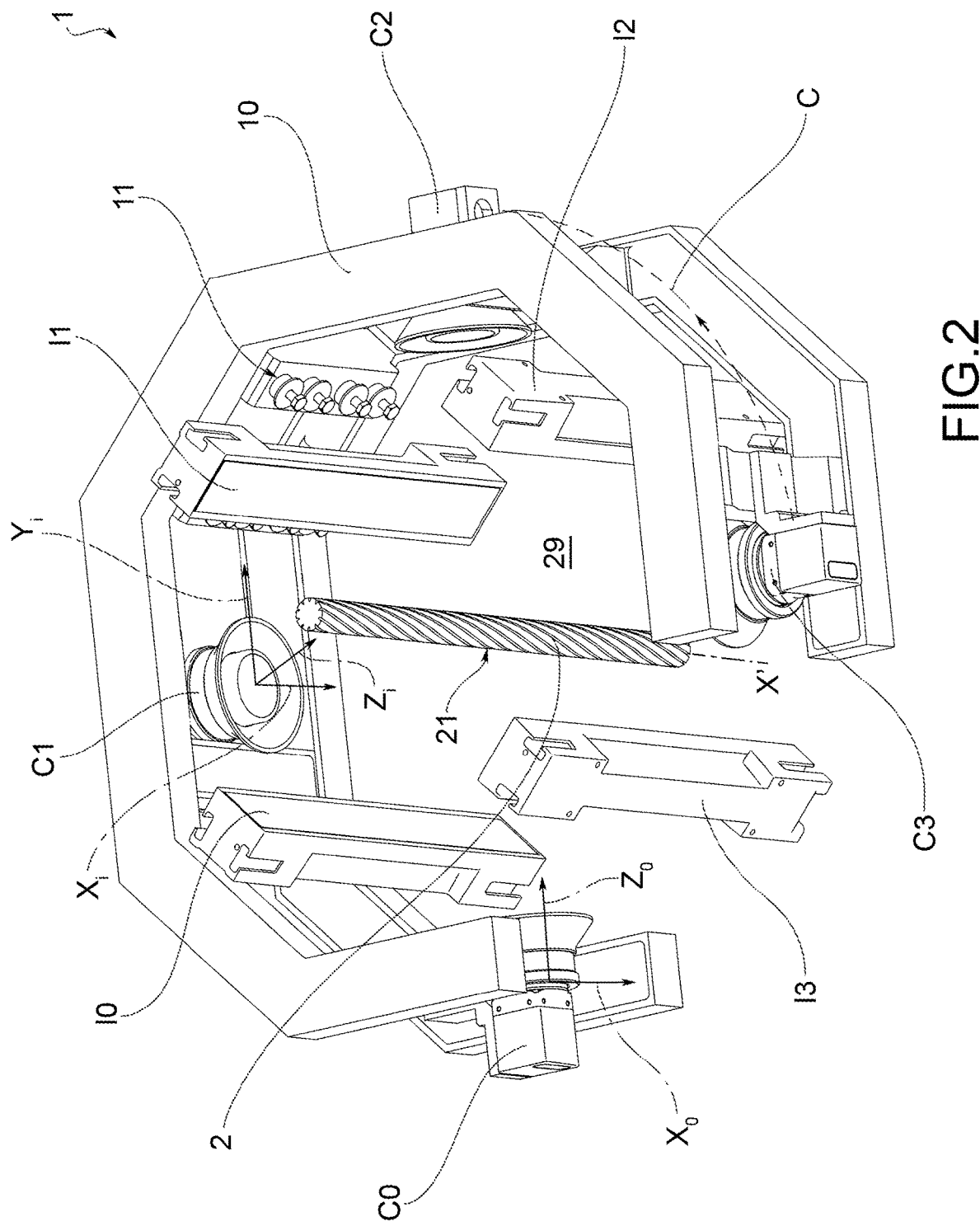
FIG. 2 shows an axonometric view of a portion of the calibrated three-dimensional optical measuring apparatus in FIG. 1, in which the frame 3' has been artificially removed for clarity of display.
Figure 3:
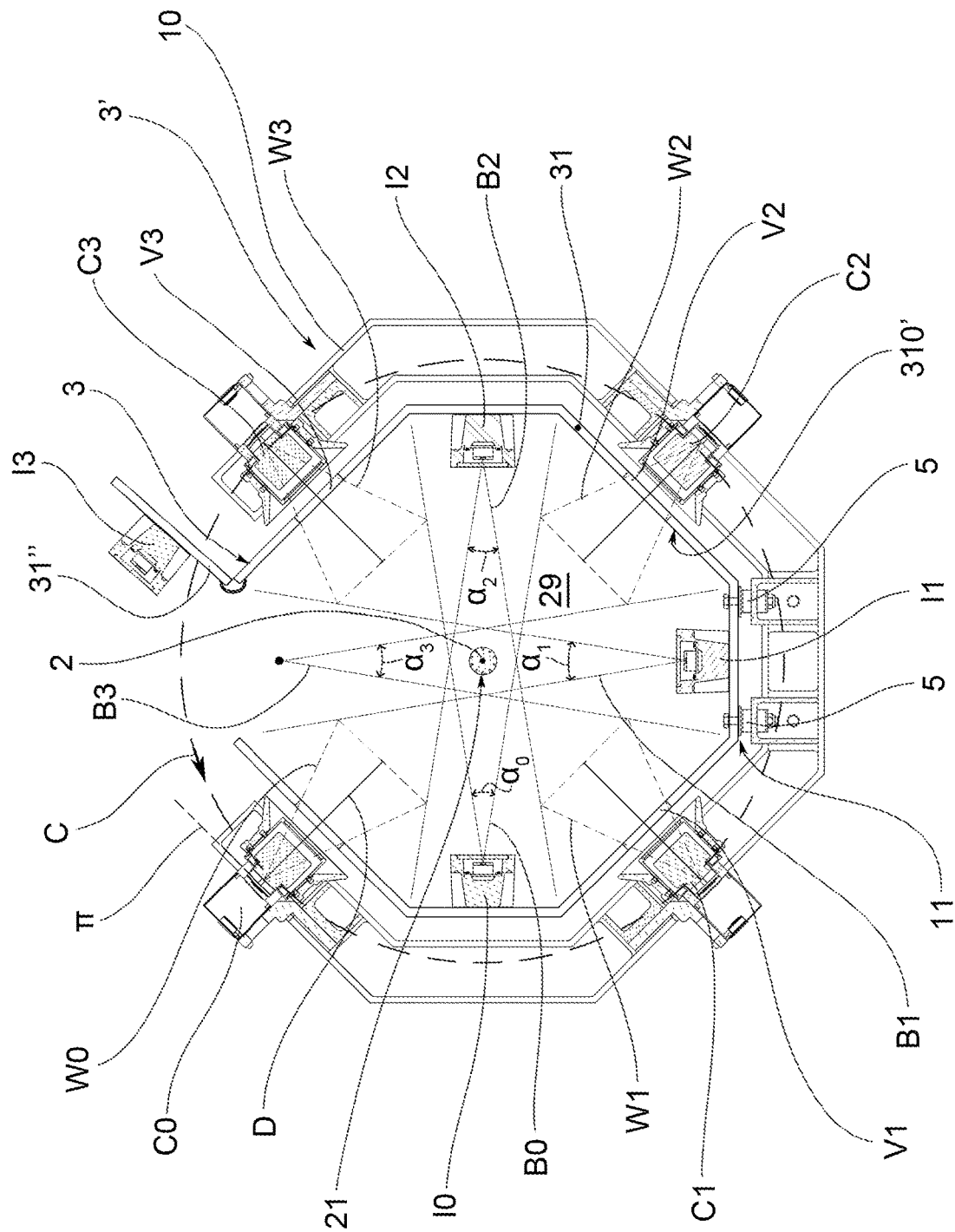
FIG. 3 shows a sectional view of the calibrated three-dimensional optical measuring apparatus in FIG. 1 along a section plane perpendicular to the dimension of greatest extension of the rope.
Figure 4:
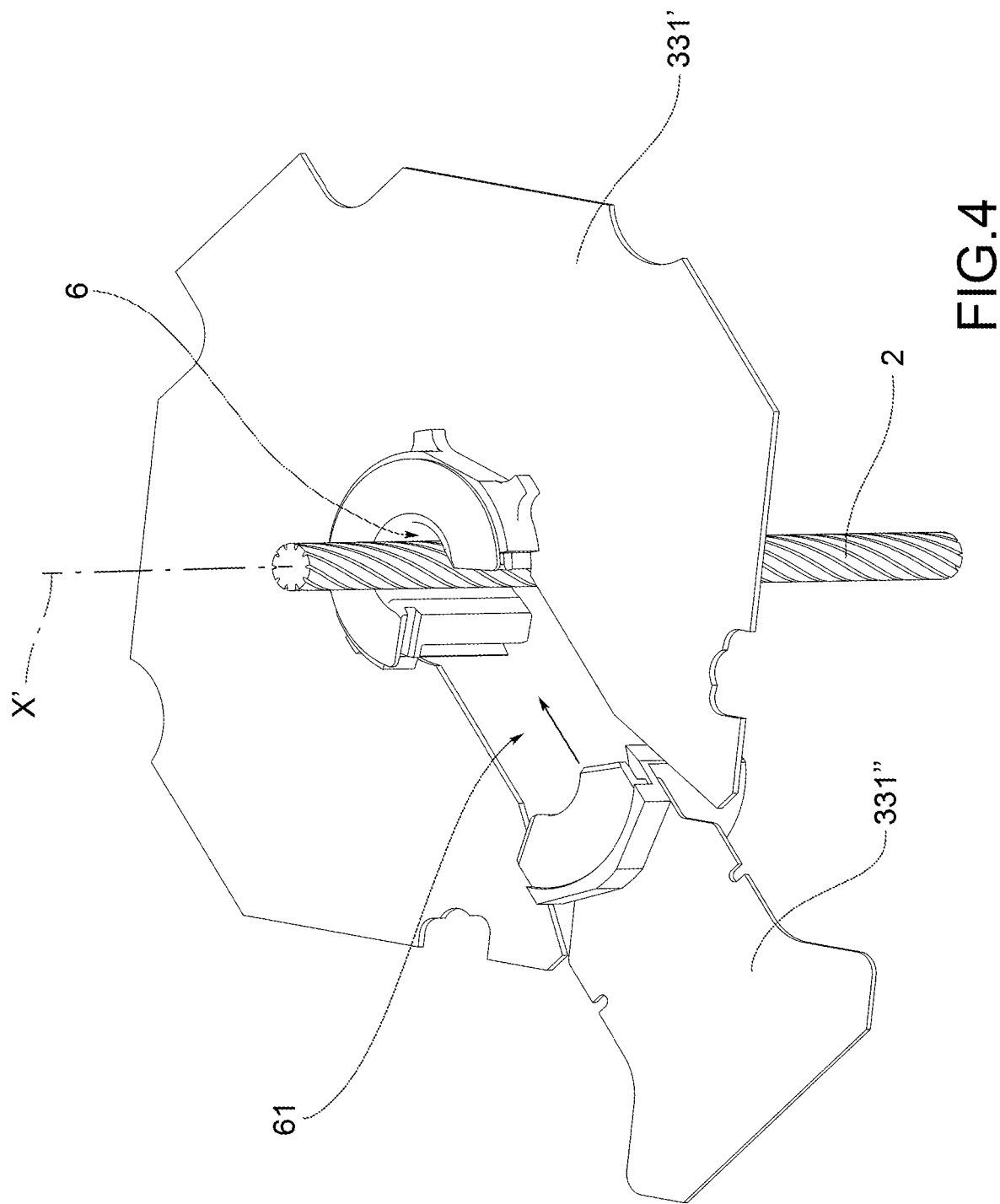
FIG. 4 shows a detail of the calibrated three-dimensional optical measuring apparatus in FIG. 1.
Figure 5:
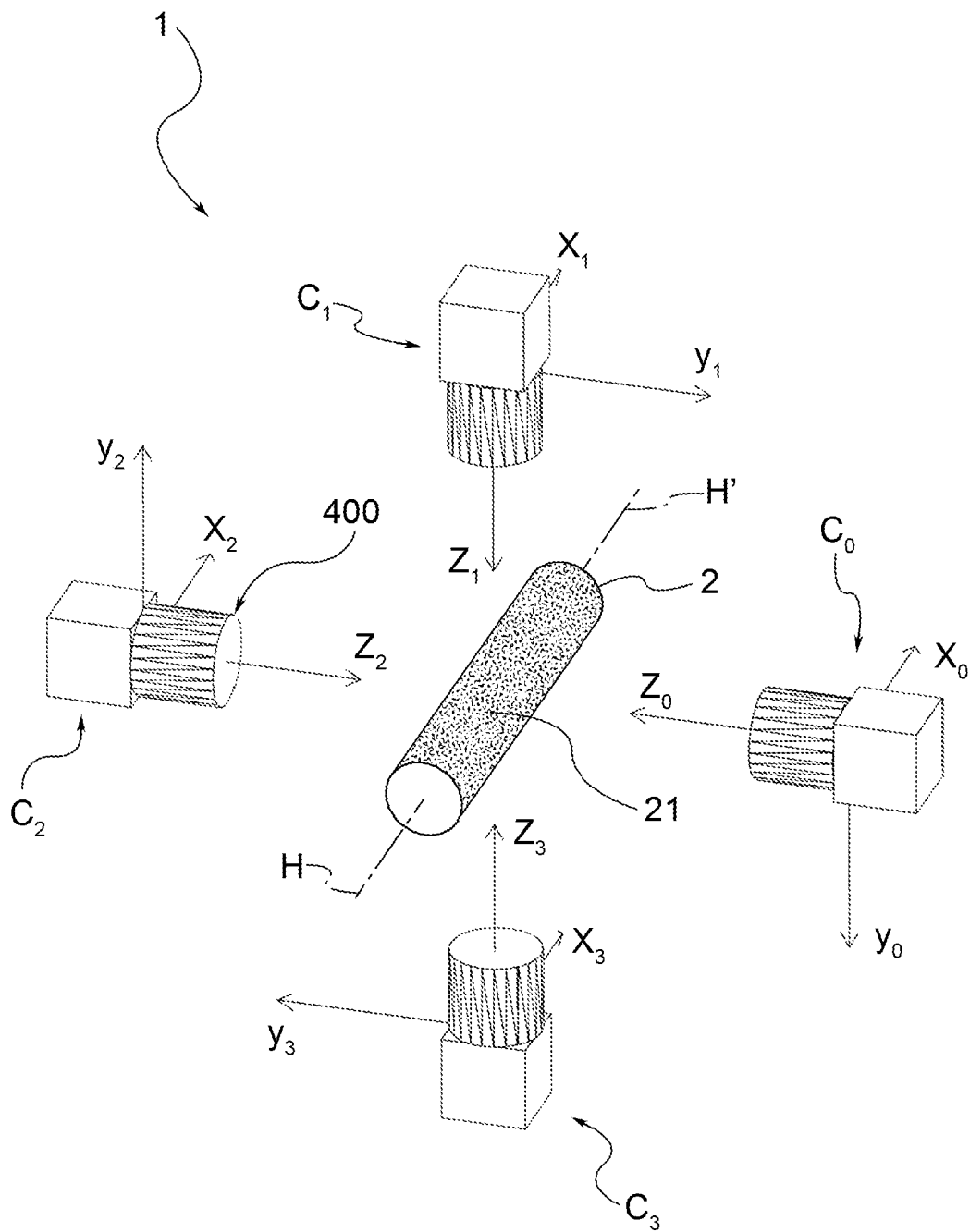
FIG. 5 shows a diagram of the calibrated three-dimensional optical measuring apparatus according to an embodiment of the invention, in which the digital image acquisition devices C0 . . . C3 and the rope are visible.
Figure 6:
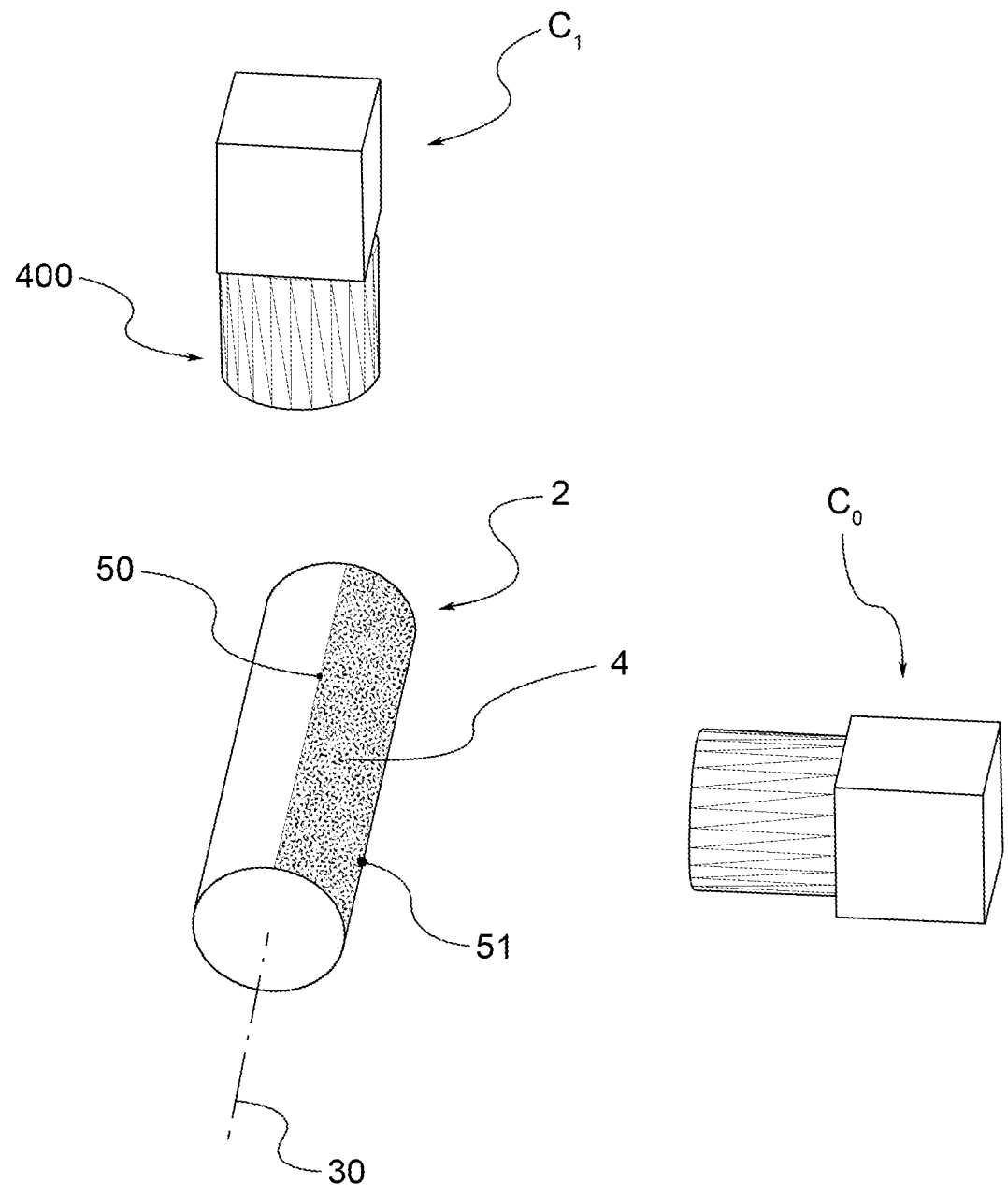
FIG. 6 shows a part of the representative diagram in FIG. 5.
Figure 7:
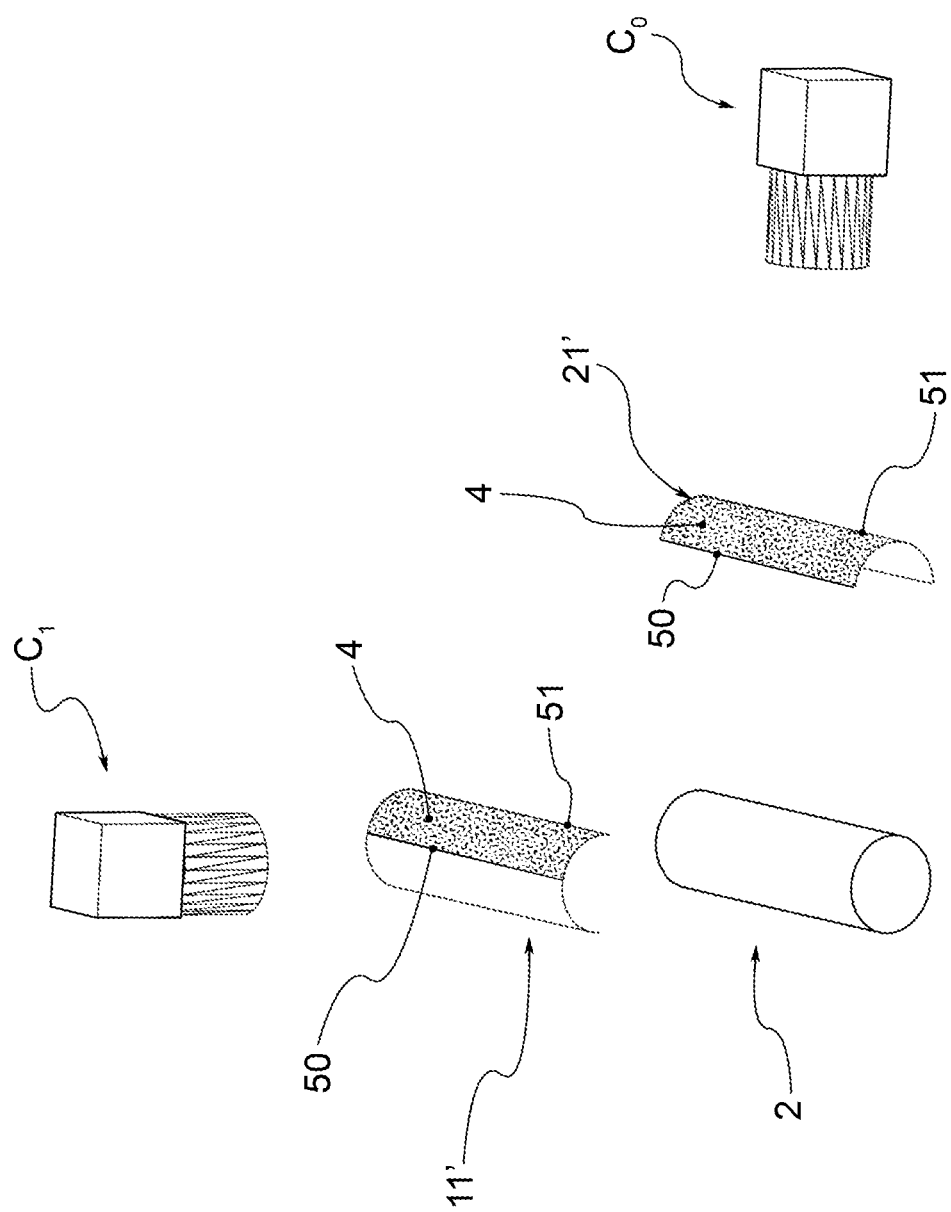
FIG. 7 shows a diagram of the calibrated three-dimensional optical measuring apparatus according to an embodiment of the invention, in which the portion of the rope is virtually shown close to each digital image detection device (framed and visible by the respective image acquisition device and in which the common area visible to both devices is shown with web points)
Figure 8:
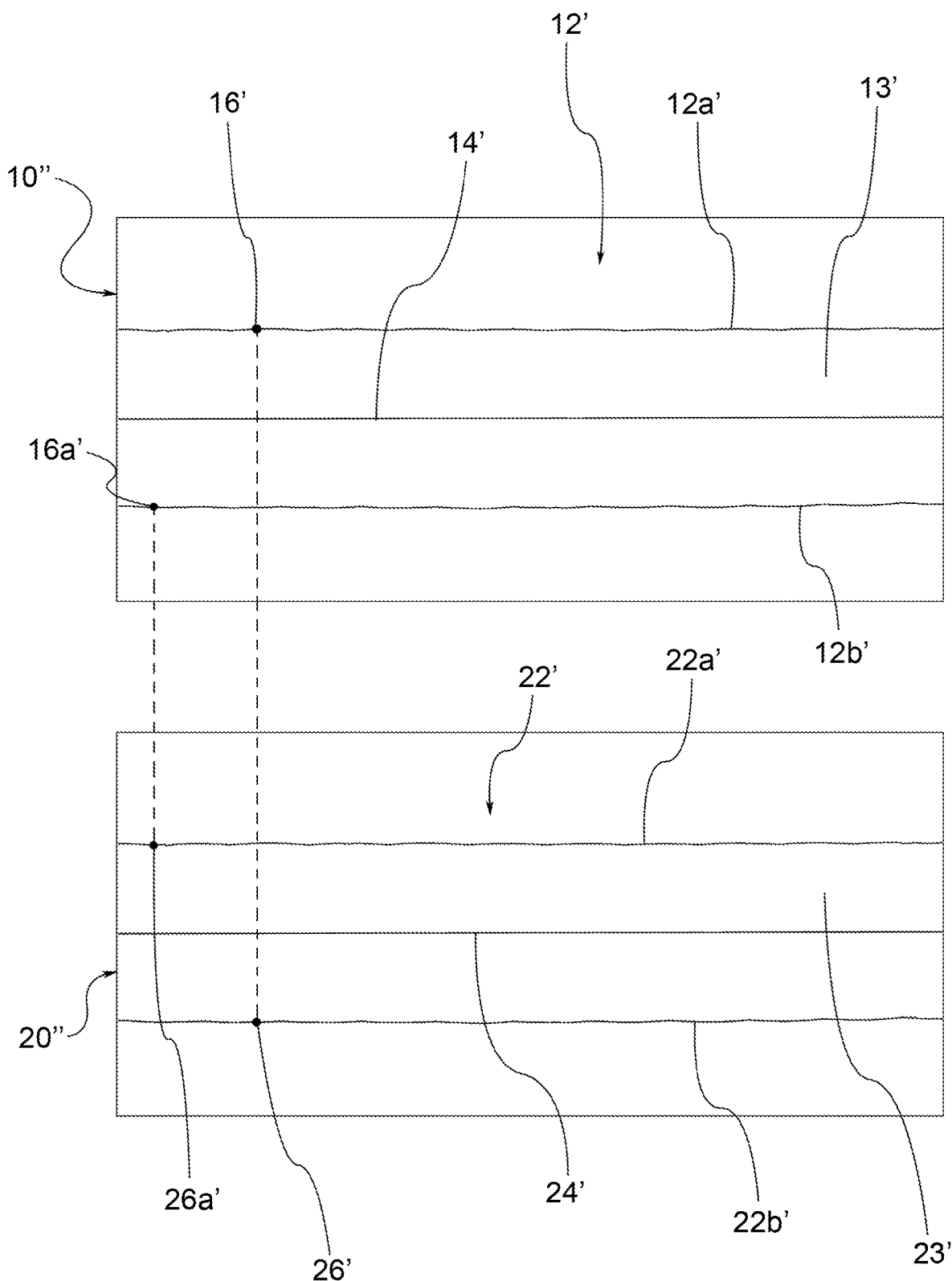
FIG. 8 shows a pair of digital images acquired and processed according to a step of an embodiment of the present invention, in which the pair of images is acquired by a pair of image acquisition devices arranged in diametrically opposite positions, as shown in the following FIG. 9.
Figure 8A:
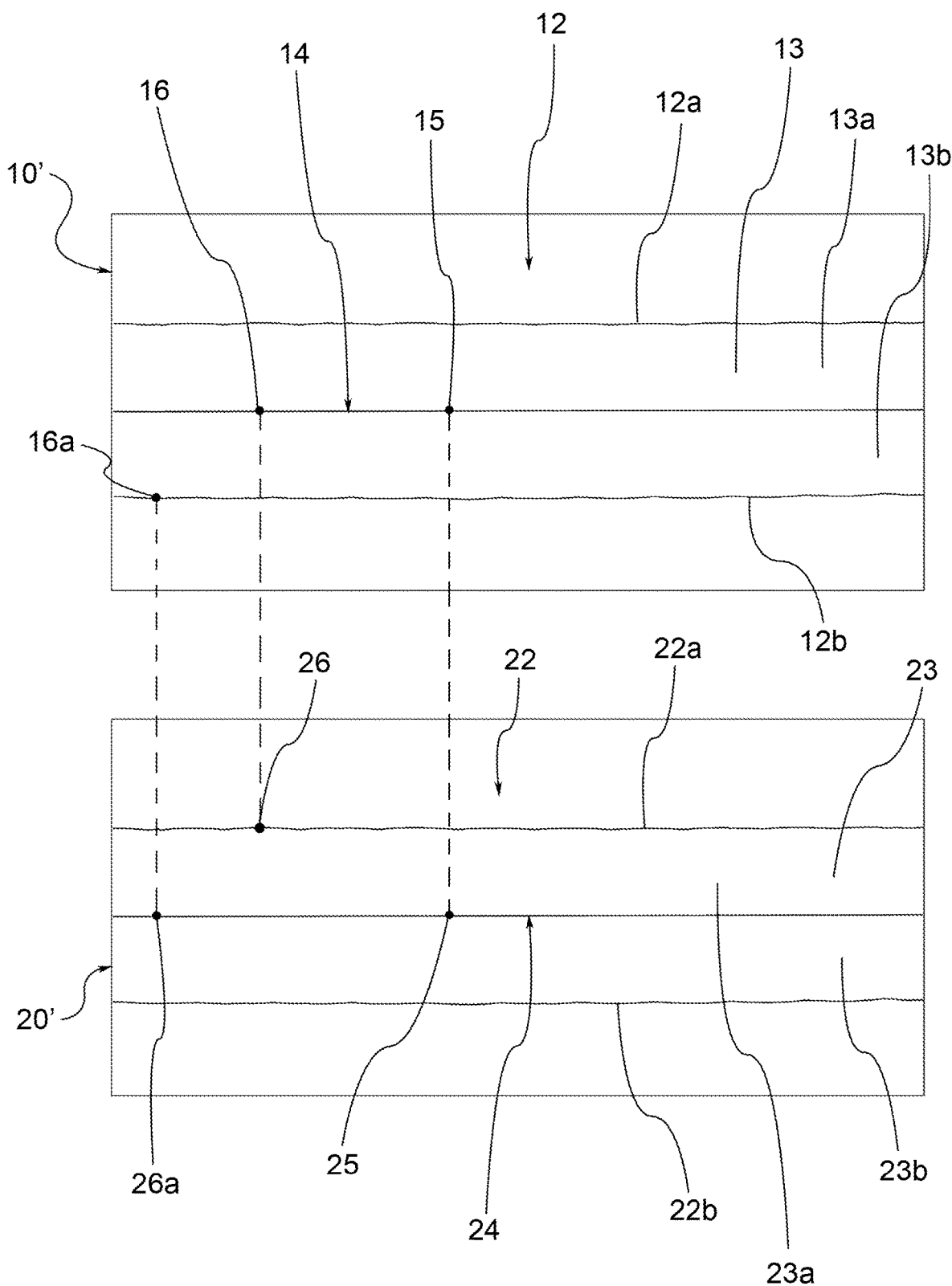
FIG. 8a shows a pair of digital images acquired and processed according to a further step of an embodiment of the present invention, in which the pair of images is acquired by two adjacent digital image acquisition devices, for example arranged along a circumference substantially centered on the rope axis and offset by 90°.
Figure 10:
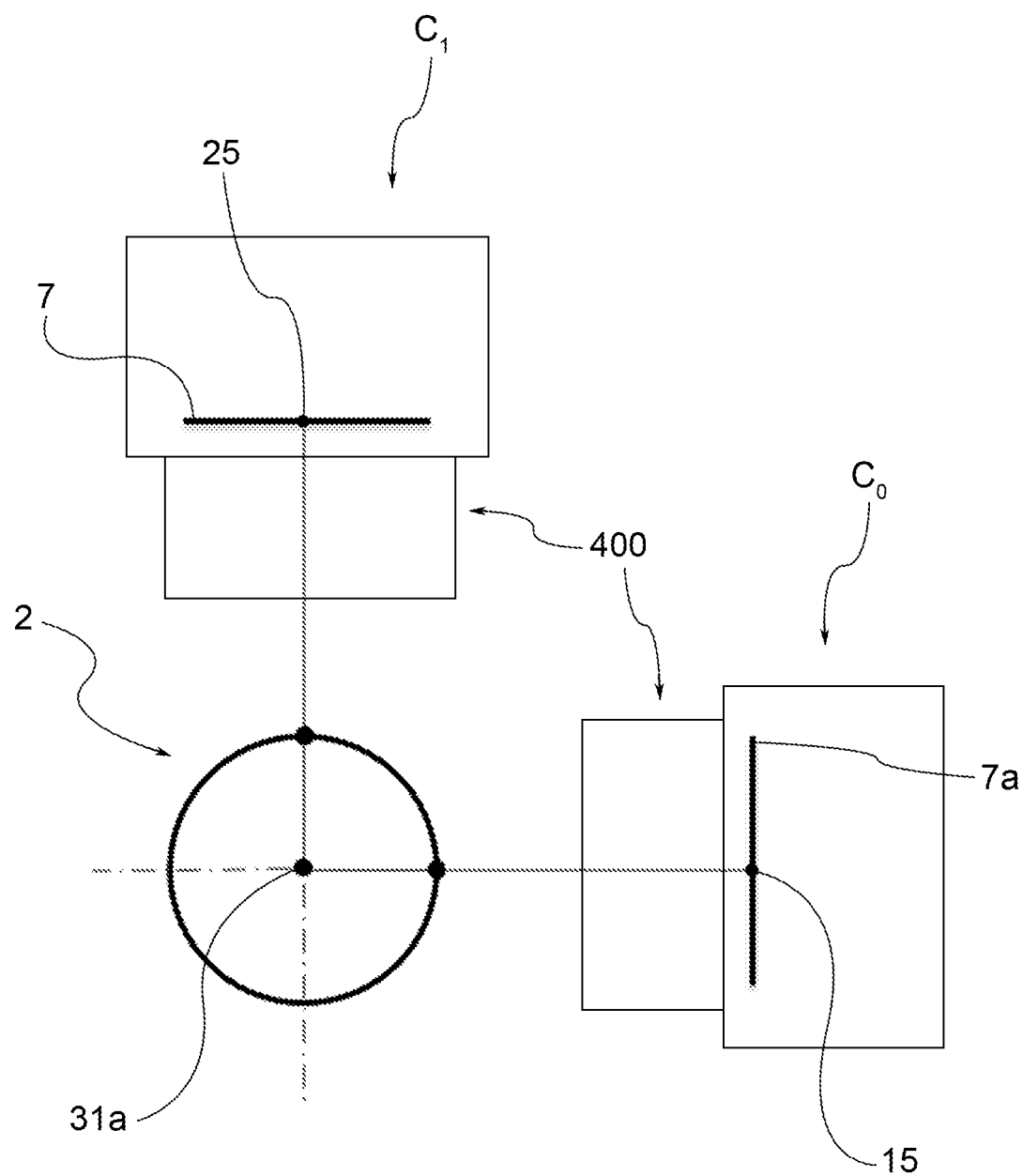
FIG. 10 shows a conceptual diagram of the method for the reconstruction of a point of the rope axis according to an embodiment of the present invention, starting from the points on the image planes (i.e., the sensor planes adapted to acquire images) of the digital image acquisition devices.

The calibrated three-dimensional optical measuring apparatus 1, for the three-dimensional measurement of geometric parameters of a rope 2, comprises a frame 3' which defines and is arranged around a rope receiving cavity 29. Furthermore, a plurality of image acquisition devices C0, C1, C2, C3 is adapted to acquire a multiplicity of digital images of at least one region of an outer surface 21 of the rope 2. Such image acquisition devices C0, C1, C2, C3 are fixed to the frame 3' and are arranged around the rope 2 when the three-dimensional optical measuring apparatus 1 receives the rope 2 in the rope receiving cavity 29.

The calibrated three-dimensional optical measuring apparatus 1 also comprises an electronic digital image processing device, configured to process the multiplicity of digital images and obtain a three-dimensional photogrammetric reconstruction of the points of the digital images of the rope acquired by the image acquisition devices C0, C1, C2, C3.

Furthermore, having defined a circumferential direction C running around a main extension axis of the rope 2 and lying on a plane P incident or perpendicular to the main extension axis of the rope 2, the image acquisition devices C0, C1, C2, C3 are arranged on the frame 3' circumferentially spaced apart from one another along such a circumferential direction C.

In accordance with a preferential embodiment, a lighting device I0, I1, I2, I3 adapted to illuminate at least one region of the rope 2 is arranged between a pair of adjacent image acquisition devices C0, C1; C1, C2; C2, C3; C3, C1 along the circumferential direction C.

Preferably, the lighting device I0, I1, I2, I3 is arranged circumferentially spaced apart from the image acquisition devices C0, C1; C1, C2; C2, C3; C3, C3 immediately adjacent along the circumferential direction C.

In particular, the lighting device I0, I1, I2, I3 is not arranged around the image acquisition device C0, C1; C1, C2; C2, C3; C3, i.e., it is not arranged concentrically around an image sensor of the image acquisition device C0, C1; C1, C2; C2, C3; C3, C1.

Preferably, the lighting device I0, I1, I2, I3 extends mainly along a direction parallel to the main extension direction of the rope 2.

Preferably, the electronic digital image processing device comprises a storage unit, in which the intrinsic and extrinsic calibration parameters of each image acquisition device C0, C1, C2, C3 are stored.

The three-dimensional optical measuring apparatus 1 comprises an attachment device 4' adapted to constrain the three-dimensional optical measuring apparatus 1 to the rope in a relatively translatable manner with respect to the rope 2. Preferably, such an attachment device 4' comprises a plurality of revolution surfaces (for example wheels) joined to the frame 3' and adapted to slidably grip the rope 2. This allows to obtain a slidably self-supporting three-dimensional optical measuring apparatus on the rope 2.

The term relatively translatable means that the apparatus can slide on the rope 2 or that the rope is moved with respect to the apparatus which is instead fixed with respect to a chosen reference system.

Each revolution surface of the plurality of revolution surfaces is adapted to be adjustably spaced along a plane transverse or perpendicular to the main extension axis of the rope 2, so as to be able to accommodate ropes with different diameters between the plurality of revolution surfaces from time to time.

In accordance with an embodiment of the invention, the frame 3' comprises a casing 3 which defines and is arranged around the rope receiving cavity 29 and a support structure 10, joined to the casing 3. The image acquisition devices C0, C1, C2, C3 are fixed on the support structure 10.

Preferably, the support structure 10 comprises a joining region 11 releasably joined to the casing 3.

Preferably, the support structure 10 is spaced apart from the casing 3 in the remaining portion of the support structure, which is different from the joining region 11.

In accordance with an embodiment of the invention, between the support structure 10 and the casing 3, a dampening element 5 is interposed, made of a material adapted to dampen the transmission of vibrations from the casing 3 to the support structure 10, for example a rubber or elastomeric material. This allows to prevent any vibrations applied to the casing 3 from being transmitted to the support structure 10, generating undesired vibrations on the image acquisition devices.

In accordance with an alternative embodiment of the invention, the casing 3 and the support structure 10 are joined to form a single piece or form part of a single piece.

According to a preferred embodiment, the support structure 10 has an open annular shape and the casing 3 has a box-like shape. In this embodiment, the casing 3 is arranged around the interior or the exterior of the support structure 10.

Preferably, the support structure comprises two open annular portions spaced apart in the axial direction X', which accommodate the image acquisition devices therebetween.

In the alternative embodiment in which the support structure 10 is arranged around the exterior of the casing 3, the casing 3 comprises a casing side wall 31 extending between a head end 32 and a tail end 33 along an axial direction X' parallel to a main extension axis of the rope 2. Such a casing side wall 31 is adapted to be arranged spaced apart from the rope 2 when the three-dimensional optical measuring apparatus 1 relatively slides with respect to the rope 2. At least one viewing window V0, V1, V2, V3 is obtained on the casing side wall 31 for each image acquisition device C0, C1, C2, C3 so that the image acquisition device can detect a digital image of the rope through said viewing window V0, V1, V2, V3.

Preferably, the casing 3 comprises a casing tail wall 331 and a casing head wall 321, which close the casing side wall 31 close to the tail end 33 and the head end 32, respectively. At least one passage opening 6, 6', which is traversable by the rope 2, is obtained on each of such head wall 321 and tail wall 331. Furthermore, the tail wall 331 and the head wall 321 each comprise at least a first wall portion 321', 331' fixed and integral with the casing side wall 31 and a removable wall portion 321", 331" releasably fixed to the first wall portion 321', 331'. Thereby, in a rope insertion configuration, the removable wall portion 321", 331" is not fixed to the first wall portion 321', 331', so as to leave a rope insertion opening 61 in the tail wall 331 and/or in the head wall 321. The rope insertion opening 61 is also communicating with the passage opening 6 to allow the insertion of the rope 2 into the passage opening 6, 6' by means of a relative movement between the casing 3 and the rope 2 perpendicular to the axial direction X'. Furthermore, in a rope installation configuration, the removable wall portion 321", 331" is fixed to the first wall portion 321', 331' so as to close the rope insertion opening 61.

Preferably, the removable wall portion 321", 331" at least partially defines the passage opening 6, 6'.

In accordance with an embodiment of the invention, the first wall portion 321', 331' comprises at least one sliding guide in which the removable wall portion 331", 321" is slidably engaged to switch from an extracted configuration, in which the rope insertion opening 61 is exposed, to an inserted configuration, in which the removable wall portion closes the rope insertion opening 61.

Preferably, the casing side wall 31 comprises a fixed portion 31' defining an axial opening 28 extending mainly along the axial direction X' between the head end 32 and the tail end 33. Furthermore, the casing side wall 31 comprises a movable portion 31", for example a door, adapted to take a closed configuration, in which the movable portion closes the axial opening 28, and an open configuration, in which the movable portion 31" is in a position which allows to access the axial opening 28. Thereby, the axial opening 28 is traversable by the rope in a relative movement between the casing 3 and the rope 2 perpendicular to the axial direction X'.

The axial opening 28 facilitates the installation of the apparatus on the rope, making the operation of inserting the rope particularly easy to perform and allowing to install the apparatus from one rope to another quickly and effectively, without complicated fixing operations.

In an advantageous embodiment of the invention, close to each rope passage opening 6, 6', the three-dimensional optical measuring apparatus 1 comprises a shielding wall 65 projecting from the head wall 321 or from the tail wall 331 and extending internally towards the rope receiving cavity 29, so as to at least partially shield the entrance of light from outside the casing towards the rope receiving cavity 29. This allows to further reduce the possible interference of external light towards the rope receiving cavity 29, thus ensuring greater robustness, precision, and 3D reconstruction reliability.

In accordance with an advantageous embodiment, the lighting device I0, I1, I2, I3 projects an illuminating beam B0, B1, B2, B3 having an opening cone with a vertex angle $\alpha 0$, $\alpha 1$, $\alpha 2$, $\alpha 3$ such as to prevent the light beam from intercepting a vision cone w0, w1, w2, w3 of each image acquisition device C0, C1, C2, C3 at least for a predefined distance D. Such a predefined distance D is calculated as a distance measured starting from the image sensor plane n of an image acquisition device C0, C1, C2, C3 and along a direction perpendicular to said image sensor plane n, towards the rope receiving cavity 29. Thereby, for at least a predetermined distance D, the vision cone w0, w1, w2, w3 of each image acquisition device C0, C1, C2, C3 is not affected by any light beam of the lighting devices I0, I1, I2, I3. Furthermore, particularly advantageously, no light beam of the lighting devices directly affects the image sensor plane n of an image acquisition device C0, C1, C2, C3 arranged on the opposite side with respect to the rope 2.

This allows to maintain adequate lighting of the rope, minimizing any lighting artifacts as much as possible.

Preferably, a material adapted to absorb the light electromagnetic radiation and reduce reflections, for example a black paint, is arranged on an inner surface 310' of the casing side wall 31. The inner surface 310' faces the rope receiving cavity 29.

In accordance with an alternative embodiment, the image acquisition devices C0, C1, C2, C3 comprise at least a first pair of image acquisition devices C0, C2 and a second pair of image acquisition devices C1, C3. In such an embodiment, the image acquisition devices of the first pair C0, C2 are arranged in a diametrically opposite manner and the image acquisition devices of the second pair 01, C3 are arranged in a diametrically opposite manner and are aligned along a perpendicular direction with respect to the alignment direction of the image acquisition devices of the first pair. Furthermore, between the first pair C0, C2 and the second pair C1, C3 of image acquisition devices, at least one lighting device I0, I1, I2, I3 is interposed along the circumferential direction C and circumferentially spaced apart from the image acquisition devices. In other words, the lighting device I0, I1, I2, I3 is interposed between the image acquisition devices of each first or second pair and is circumferentially spaced apart from each of such image acquisition devices of each pair.

The present invention also relates to a three-dimensional optical measurement method for the three-dimensional measurement of geometric parameters of a rope 2. The method comprises the steps of:
a) providing a three-dimensional optical measuring apparatus 1, for example a three-dimensional optical measuring apparatus 1 described in the present discussion, comprising a plurality of image acquisition devices C0, C1, C2, C3 fixed to a frame 3' and arranged spaced apart around the rope 2 along a circumferential direction C running around a main extension axis of the rope 2 and lying on a plane P incident or perpendicular to the main extension axis of the rope 2,
and in which a lighting device I0, I1, I2, I3 adapted to illuminate at least one region of the rope 2 is arranged along the circumferential direction C between a pair of adjacent image acquisition devices C0, C1; C1, C2; C2, C3; C3, C1;

b) performing a relative movement between the rope 2 and the three-dimensional optical measuring apparatus 1;
c) during the relative movement of step b), illuminating the rope by means of the lighting device I0, I1, I2, I3 and acquiring a plurality of digital images of at least one region of an outer surface 21 of the rope 2;
e) processing the multiplicity of digital images by means of an electronic device and obtaining a three-dimensional photogrammetric reconstruction of points of the digital images of the rope 2 acquired by the image acquisition devices.

In a preferred embodiment, the image acquisition devices C0, C1, C2, C3 are cameras with a matrix (two-dimensional) image sensor. Preferably, the optics 400 of the cameras have optical foci which lie on a circumference offset by 90° and each optic 400 faces the center of the circumference. A system of right-hand Cartesian axes Xi, Yi, Zi can be identified on each camera, for example with i={0,1,2,3}, being integral with the n-th camera, respectively, originating in the focus of the optics, having the Xi and Yi axes with direction and orientation coinciding with the X and Y axes of each camera image sensor; preferably, such cameras C0, C1, C2, C3 are oriented so that the axes Xi are perpendicular to the plane containing the circumference and all oriented in the same orientation, the axes Zi oriented towards the center of the circumference. The three-dimensional space X0 Y0 Z0 of the camera C0 is preferably taken as an absolute three-dimensional reference system.

Preferably the rope is appropriately positioned inside the system, so that it is included in the field of vision of each camera and the dimensions of the radius of the circumference on which the cameras are placed, the focal distance of the optics, the dimensions of the camera sensors are adjusted so that they are adapted to the length of the sample measured along the axis, to the maximum measurable diameter or to the resolution to be obtained for the measuring system.

Preferably the system is subjected to calibration, for example as soon as the assembly step of the image acquisition devices is completed, in order to obtain the intrinsic and extrinsic parameters of each device required for the subsequent steps for the three-dimensional photogrammetric reconstruction of the points of the acquired images, thus obtaining an intrinsically calibrated system.

Referring to the well-known definition of epipolar line of epipolar geometry (which describes the geometric relationships and constraints which bind two 2D images of the same 3D scene captured by two cameras), it is known that a point on an image subtends a line in the world, and the straight line in the world projected on another image, acquired by a camera placed in a different point of view, represents the epipolar line where the homologue of the point of the first image lies. The relationships between homologous points, epipolar lines and the geometry of the image acquisition system are described by means of suitable known algebraic relationships. In order to exploit the above notions of epipolar geometry, for example, if the image acquisition device is a camera, the following are calculated:
the intrinsic (or calibration) matrix;
the dix parameters of the distortion function $f_i(r)=(1+d_{i1}r+d_{i2}r^2+d_{i3}r^3+d_{i4}r^4+d_{i5}r^5+d_{i6}r^6)$ of the n-th camera where r represents the distance of the point on the digital image at the center of the sensor, in which such parameters allow to correct images from the effects of the intrinsic distortion of the optics;
the rototranslation matrix between the Cartesian systems of each camera;

the essential matrix;
the fundamental matrix;
the rectification matrices;
the projection matrices from the 3D space-rectified planes.

Preferably, after the calibration, having calculated the aforesaid parameters and the aforesaid matrices, for example, any point belonging to the rope is photogrammetrically reconstructed in a three-dimensional space starting from two images acquired by two different image acquisition devices which frame such a point of the rope or cable.

More in particular, in a preferred embodiment, the method for the three-dimensional optical measurement of geometric parameters of a rope 2, for example by means of a three-dimensional optical measuring apparatus 1 described above, also comprises the steps of:

- a1) acquiring a first digital image 10', 10" of a first region 11' of the outer surface of the rope;
- b1) acquiring a second digital image 20', 20" of a second region 21' of the outer surface of the rope 2, said second region 21' being at least partially distinct from said first region 11';
- c1) determining a first 12, 12' and a second 22, 22' series of contour lines on said first 10', 10" and said second 20', 20" digital images of said first 11' and said second 21' regions of the outer surface of the rope, respectively, in which said first 12, 12' and said second 22, 22' series of contour lines comprise a first plurality of image contour points and a second plurality of image contour points, respectively;
- d1) searching for a first contour point 16, 16a, 16', 16a' and a second contour point 26, 26a, 26', 26a' belonging to said first plurality of image contour points and said second plurality of image contour points, respectively, so that the first contour point 16, 16a, 16', 16a' and the second contour point 26, 26a, 26', 26a' are homologous points or points belonging to the same epipolar line and each represent the image of a surface point 50, 51, 52 said surface point 50, 51, 52 being a point shared by the first 11' and second 21' regions of the outer surface of the rope 2;
- e1) photogrammetrically back-projecting the first 16, 16a, 16', 16a' and second 26, 26a, 26', 26a' contour points in a three-dimensional space 40, so as to obtain a 3D contour point 60', 61', 62' referring to said three-dimensional space 40;
- f1) repeating steps a1) to e1) a plurality of times until obtaining the three-dimensional representation of at least a first plurality of 3D contour points 60' and a second plurality of 3D contour points 61', 62' referring to said three-dimensional space 40;
- g1) calculating at least one of the following geometric parameters of the rope by means of at least the first plurality of 3D contour points and/or the second plurality of 3D contour points: rope diameter 80, 81 or rope roundness, or rope axis 30.

It is apparent that the term roundness also means an index of the rope roundness.

For example, the first series of contour lines 12 is the depiction on the digital image of the contour lines of the first region of the outer surface 11' of the rope or cable, seen by a first digital image acquisition device C1, while the second series of contour lines 22 is the depiction on the digital image of the contour lines of the second region of the outer surface 21' of the rope or cable, seen by a second digital image acquisition device C0.

Preferably, the operations for calculating the axis of the rope or cable include calculating the length of the axis and the orientation thereof.

Preferably, in addition to the aforesaid steps, 3D contour lines 70a, 70b, 70c, 70d of the outer surface of the rope or cable are calculated, in which each 3D contour line 70a, 70b, 70c, 70d is obtained as a regression which best approximates the first plurality of 3D contour points 60' or the second plurality of 3D contour points 61', 62'.

Therefore, at least two and preferably four 3D contour lines of the entire surface of the rope or cable are preferably obtained.

Any of the 3D-multi-camera-reconstruction algorithms is used for the photogrammetric back-projection of the points in the three-dimensional space, some non-exhaustive examples are Triangulation algorithm or Disparity Map reprojection for 3D algorithm or combinations thereof.

In an embodiment of the method, the respective digital images of the stationary or moving sample with respect to the cameras are detected. Each digital image is then corrected and purified from the effects of optical distortion by reconstructing, with the aid of the fi(r) function described above, the correct position of each point.

In the following description, homologous points mean each of the points on the digital images acquired by respective digital image acquisition systems, which represent the same point in the real three-dimensional world. For example, such homologous points can be searched on the images by means of known algorithms for the search of homologous points, such as Image correlation based, Edge based, Segment based, Adaptive windows, Coarse-to-fine, Dynamic programming, Markov random fields, graph cuts Multi-baseline or combinations thereof.

In an embodiment of the method, in which at least a part of the first 12 and a part of the second 22 series of contour lines delimit a first 13 and a second 23 area of the digital image of the first 10' and second 20' digital images, respectively, obtained for example from the steps a1) to c1) described above, the 3D midpoints 32' representative of the rope axis 30 are preferably obtained according to the following steps:

- c2) calculating a first mean axis 14 and a second mean axis 24 in each first 12 and second 22 series of contour lines, in which said first 14 and second 24 mean axes are obtained as a regression which best approximates at least a part of the first plurality of image contour points and at least a part of the second plurality of image contour points, respectively, and in which said first 14 and second 24 mean axes divide the first 13 and second 23 areas of the digital image, respectively, into a respective first sub-area 13a, 23a and a second sub-area 13b, 23b;
- d2) searching for a first midpoint 15 and a second midpoint 25 belonging to the first 14 and second 24 mean axes, respectively, so that the first midpoint 15 belongs to the same epipolar line as the second midpoint 25 and so that the first and second midpoints represent the virtual image of a point 31a belonging to a 3D mean axis 30 of the rope or cable 2;
- e2) photogrammetrically back-projecting the first 15 and second 25 midpoints in a three-dimensional space 40, so as to obtain a 3D midpoint 32' referring to said three-dimensional space 40;
- f2) repeating steps c2) to e2) a plurality of times until obtaining the three-dimensional representation of a plurality of 3D midpoints 32' representative of the points of the rope axis 30. Therefore, such midpoints are preferably a series of points identified by means of three Cartesian coordinates and describe the point-by-point trend of the axis of part or of the entire rope along a preferential direction of such a rope.

Preferably, in addition to the aforesaid steps, the step is included for calculating an interpolated 3D mean axis 33', obtained as a regression which best approximates the plurality of 3D midpoints 32'. For example, such a regression is any regression curve and preferably a regression line.

In a further embodiment of the method, it is also possible to measure the diameter of the rope or cable, according to the following steps:

sampling the interpolated 3D mean axis 33' so as to obtain a plurality of sampled 3D axial points belonging to said interpolated 3D mean axis 33';

calculating at least a first 72, a second 74, a third 71 and a fourth 73 contour intersection point as the intersection between a plane perpendicular to the interpolated 3D mean axis 33' passing through an axis point 34 of said plurality of sampled 3D axial points and the 3D contour lines 70a, 70b, 70c, 70d;

calculating at least a first axis distance 82, a second axis distance 83, a third axis distance 84 and a fourth axis distance 85, as the distance between the first contour intersection point 72 and the axis point 34, between the second contour intersection point 74 and the axis point 34, between the third contour intersection point 71 and the axis point 34 and between the fourth contour intersection point 73 and the axis point 34, respectively;

calculating at least a first diameter 80 and a second diameter 81, as the sum of the first axis distance 82 and the second axis distance 83 and as the sum of the third axis distance 84 and the fourth axis distance 85, respectively.

Preferably, the point roundness of the rope or cable is measured as the ratio between at least the first diameter 80 and the second diameter 81.

Furthermore, in an alternative of the method, in the case of sufficiently axial-symmetrical ropes or cables, the rope diameter is calculated as the distance between the first contour point and the second contour point.

Subsequently, it is also possible to calculate statistical variables on the basis of the sample population of the calculated point roundnesses, for example the mean roundness, as the mean of the point roundnesses or the variance of the point roundnesses.

Furthermore, the method of the present invention comprises the step of calculating the waviness of the rope or cable, i.e., a measurement of the surface homogeneity of the rope.

To calculate the waviness of the outer surface of the rope, the method comprises the steps of:

w1) calculating at least the first axis distance 82 or a plurality of axis distances, for example the first 82, the second 83, the third 84 and the fourth 85 axis distances;

w2) iterating the calculation of step w1) for a given length of the rope or for the entire length of the rope;

w3) calculating at least one statistical variable on the basis of the sample population of a plurality of first axis distances 82, acquired in step w2) or of the sample population of a plurality of axis distances 82, 83, 84, 85, for example the sample standard deviation of the first axis distances 82, or a processing of the sample standard deviations of the plurality of axis distances 82, 83, 84, 85, or the mean value of the sample standard deviations of the plurality of axis distances 82, 83, 84, 85.

The mean value of the sample standard deviations of the plurality of axis distances 82, 83, 84, 85 is a preferred index for the assessment of the waviness of the outer surface.

Figure 11:
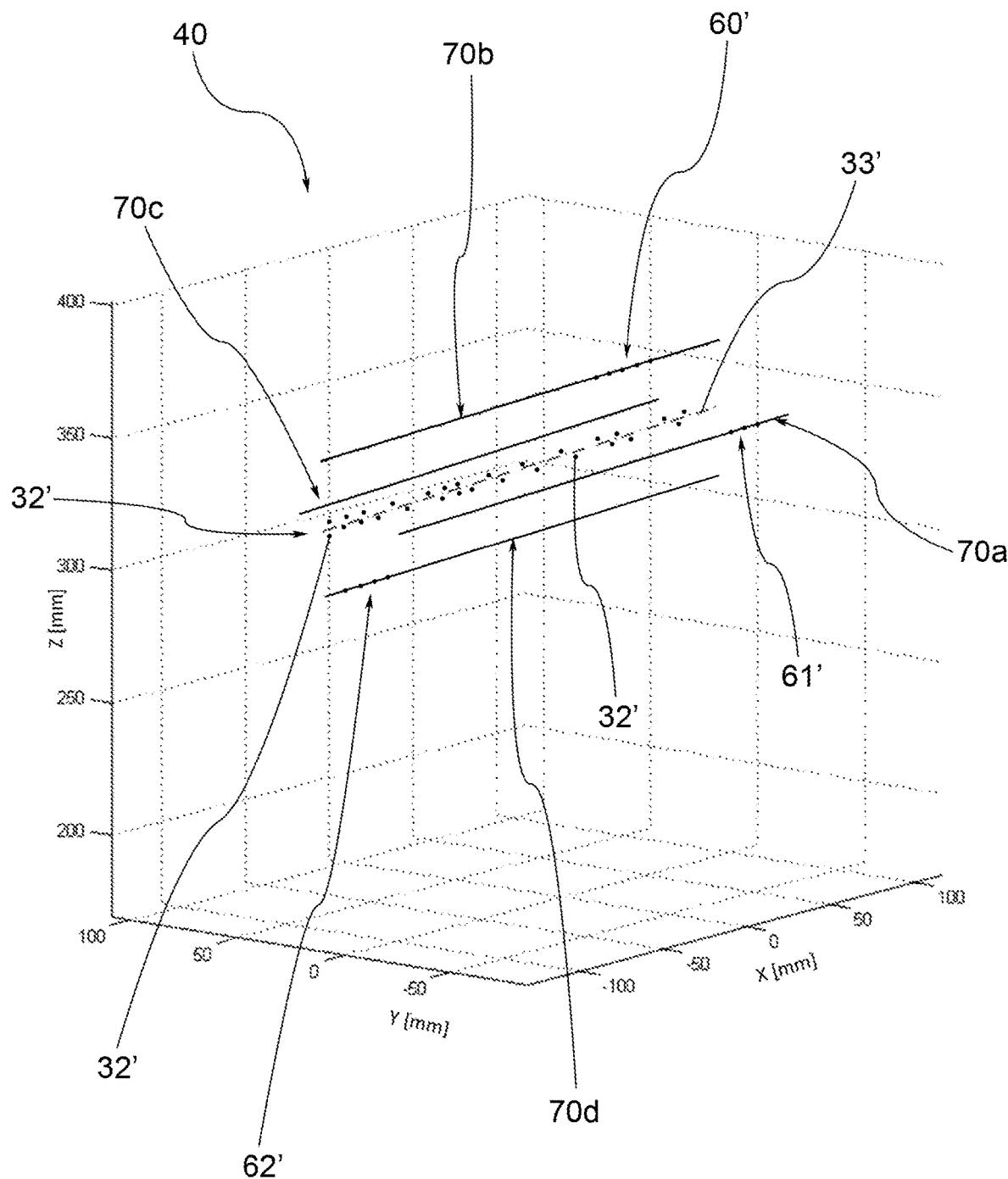
FIG. 11 shows a reconstruction of the 3D contour lines, of the points of the axis and of the interpolated 3D mean axis in a three-dimensional space of a rope (or a cable) according to an embodiment of the present invention.
Figure 12:
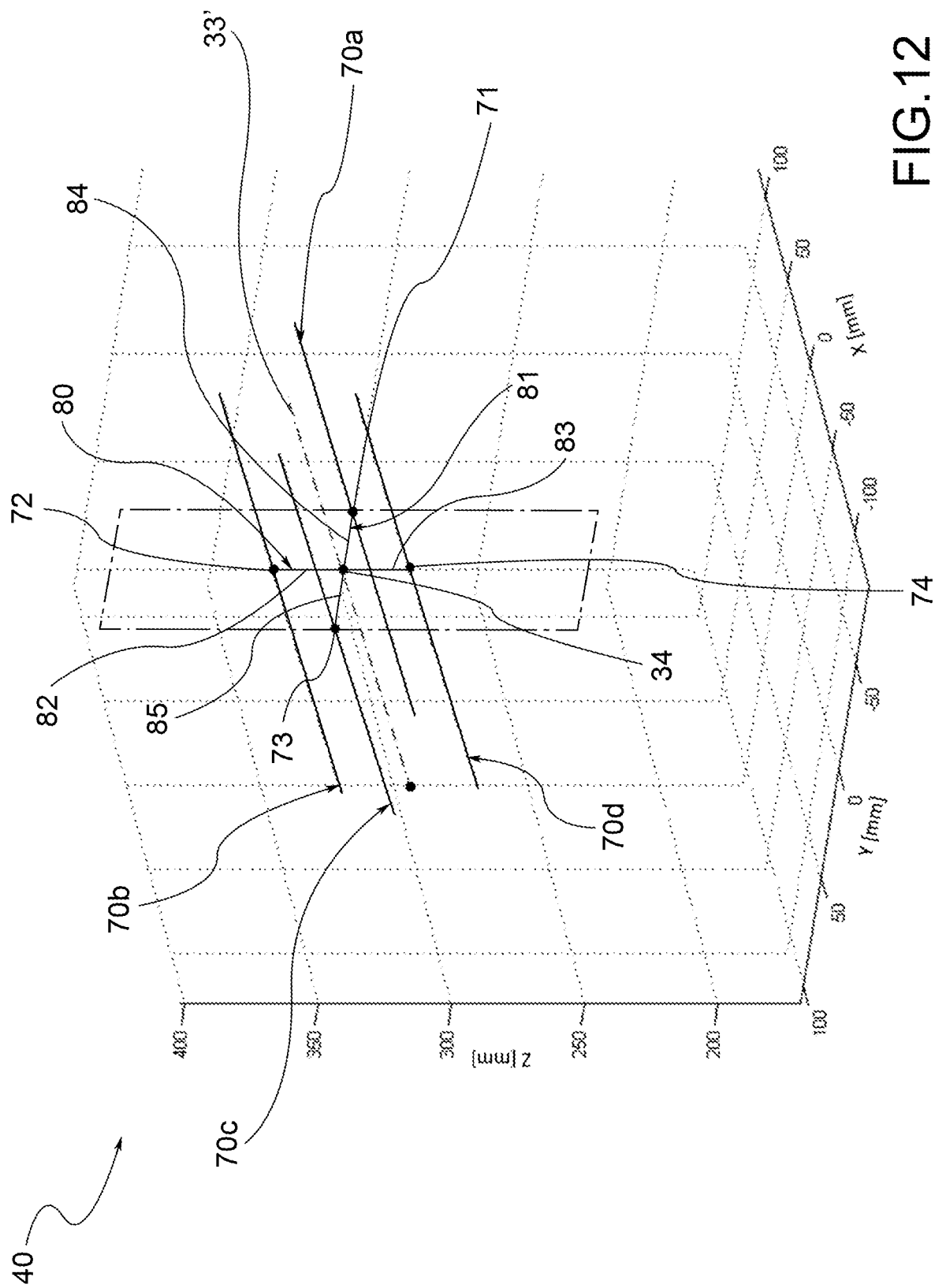
FIG. 12 shows a reconstruction of the 3D contour lines, the interpolated 3D mean axis and the diameters of a rope (or a cable) in a three-dimensional space according to an embodiment of the present invention.
Figure 13:
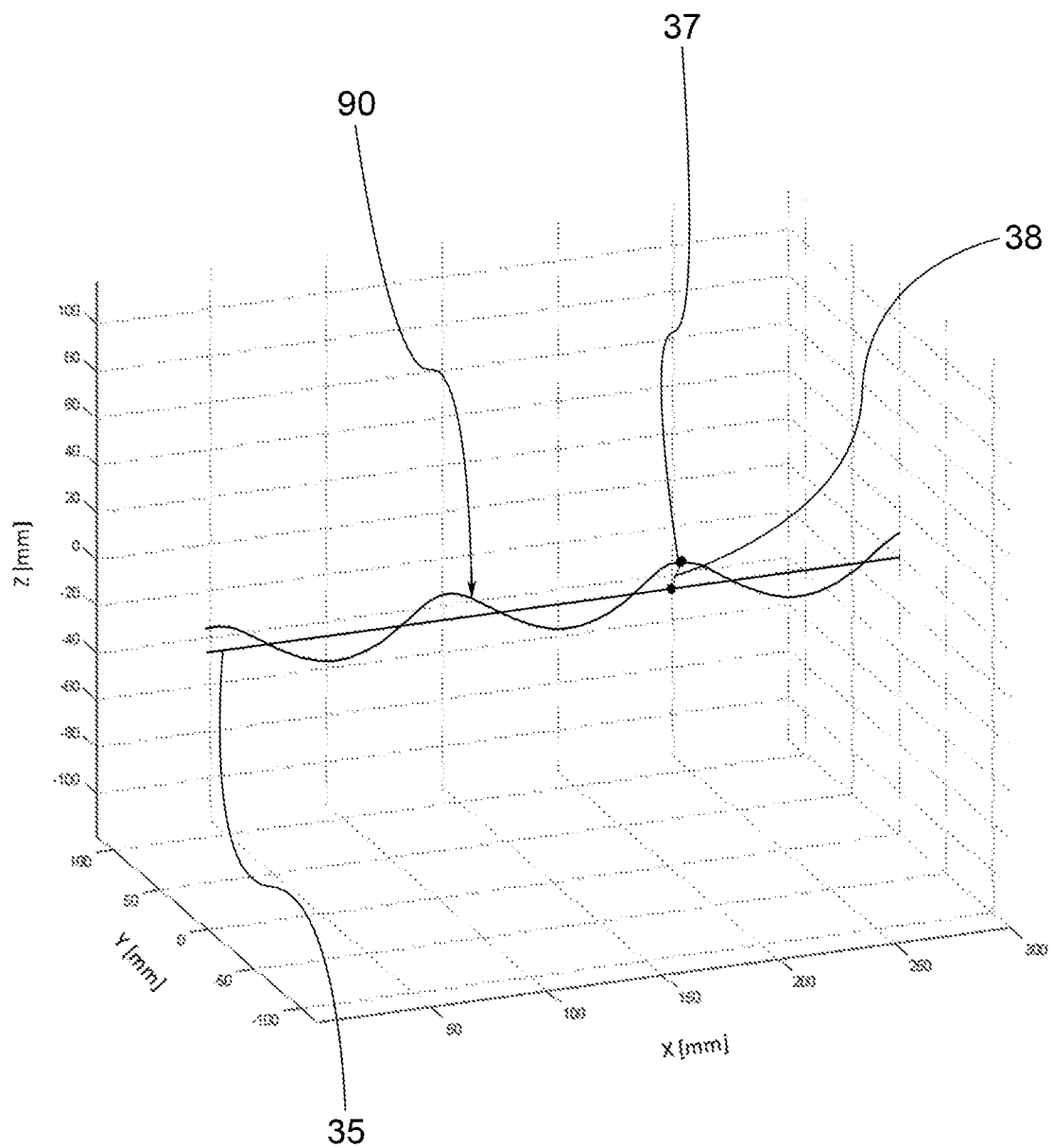
FIG. 13 shows a reconstruction of the ideal 3D mean axis and of the real axis obtained by interpolating points with an interpolating curve in a three-dimensional space according to an embodiment of the present invention.
Figure 14:
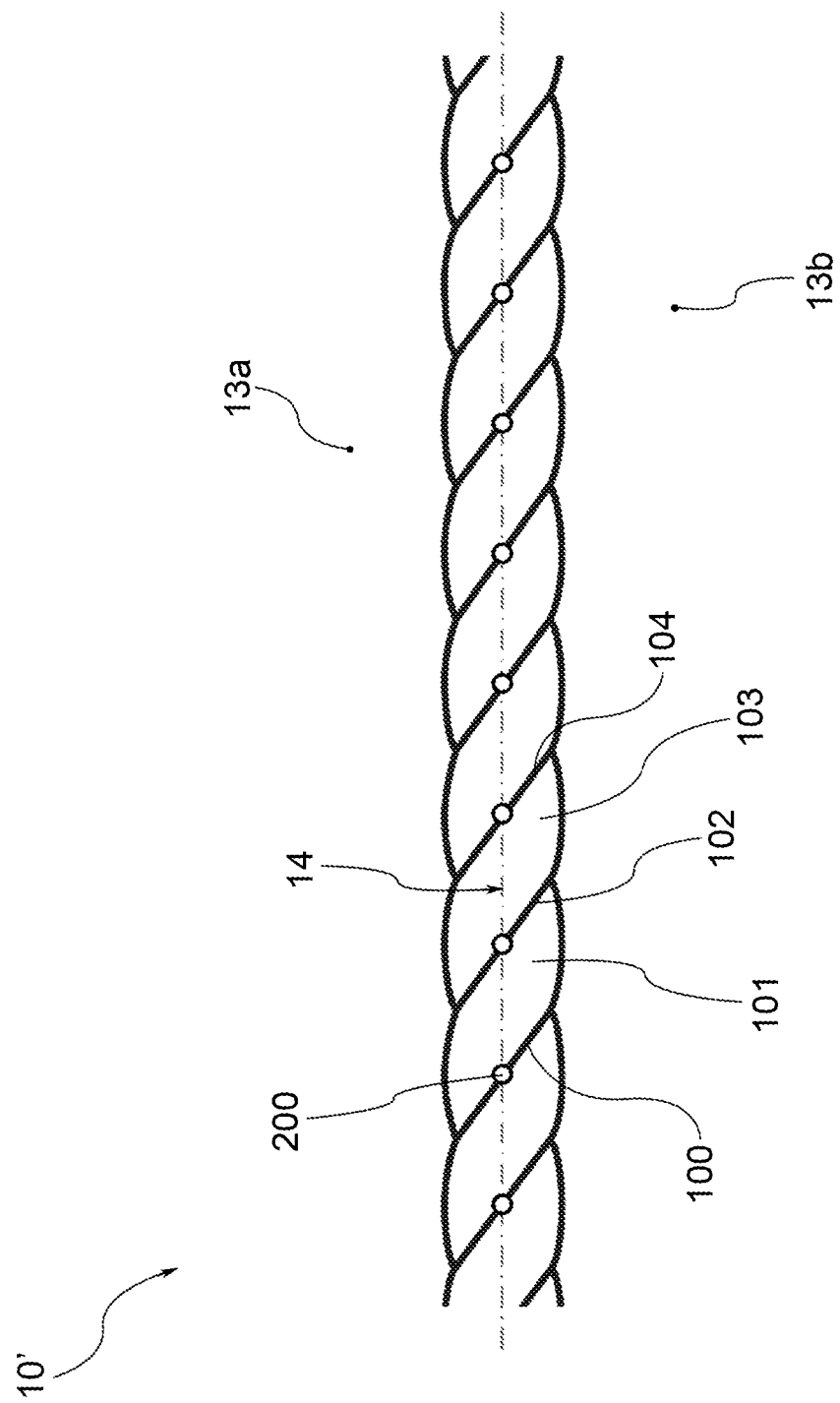
FIG. 14 illustrates a digital image of a spiral-surface rope acquired and processed according to an embodiment of the present invention.
Figure 15:
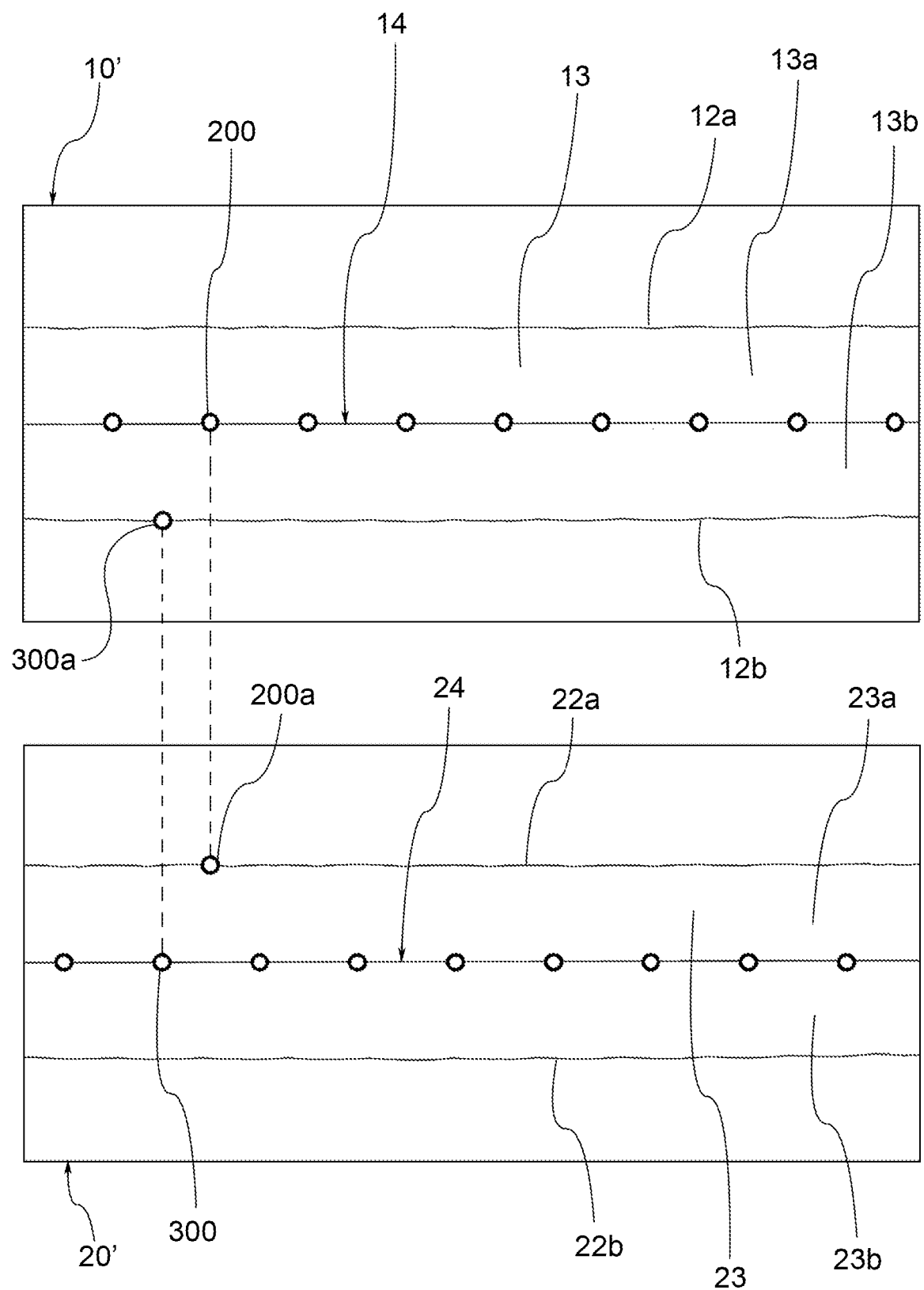
FIG. 15 shows a pair of digital images acquired and processed according to a further step of an alternative embodiment of the present invention, in the case of a rope (or a cable) with a spiral surface, in which the points of intersection between the contours of the coils and the mean axis of each image are obtained.
Figure 16:
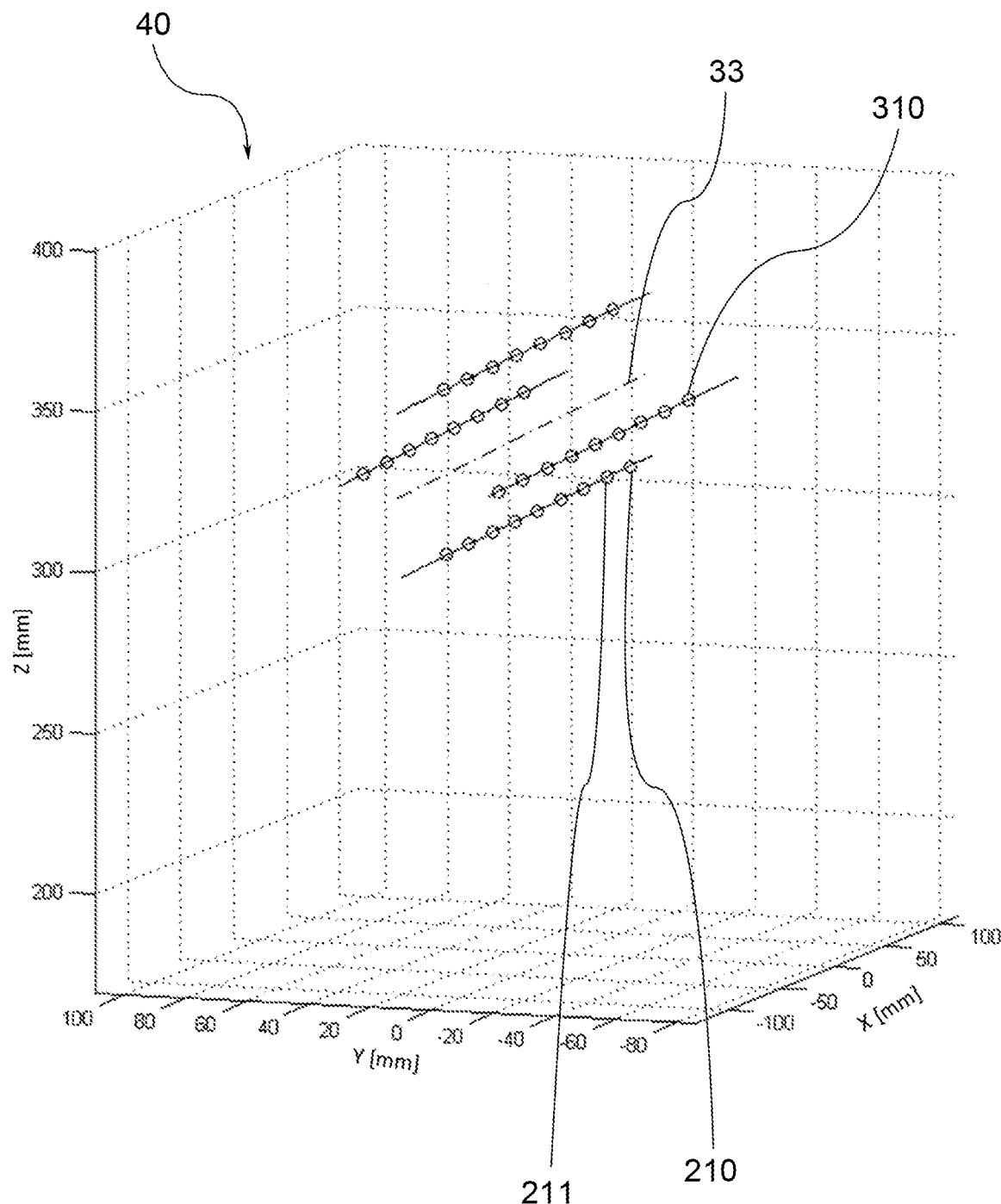
FIG. 16 illustrates a reconstruction of the axis, and of the points of the helical or spiral surface of a rope (or a cable) to calculate the pitch of the helix or the coil in a three-dimensional space according to an embodiment of the present invention.

In an embodiment of the method, it is preferable to acquire at least one pair of digital images and for each pair of images of the rope or cable perform the following operations:

a3) by means of the rectification matrices, the points of the images are transformed from the respective 2D planes of the camera sensor to the rectified 2D planes, obtaining a first rectified image and a second rectified image;

b3) in each rectified image, the image of the sample is isolated from the background, the points identifying the contour lines of the rope or cable profile are extracted and the regression line which best approximates the axis of the rectified image is calculated; for example, if the contour lines of the profile consist of an upper line 12a, 22a and a lower line 12b, 22b, for example arranged parallel to a preferential direction of the sensor, the regression line which best approximates the axis of the rectified image of the sample is calculated as the regression line of the points obtained from the mean of the coordinates of the points belonging to the upper line 12a, 22a and to the lower line 12b, 22b;

c3) for each point of the upper line 12a of the first rectified image, homologous points in the second rectified image are searched;

d3) for each point of the lower line 22b of the second rectified image, homologous points in the first rectified image are searched;

e3) for each point of the axis of the first rectified image, the point of the axis of the second rectified image belonging to the same epipolar line is searched;

f3) if each camera of the pair of cameras is positioned diametrically opposite with respect to the axis of the rope or cable, for each point of the upper line 12a' on the first rectified image, the point of the upper line 22a' or of the lower line 22b' of the second rectified image belonging to the same epipolar line and to the same common area 4 of the region of the outer surface 11', 21' of the rope visible from both cameras is searched, and for each point of the lower line 12b' on the first rectified image the point of the lower line 22b' or of the upper line 22a' of the second rectified image belonging to the same epipolar line and to the same common area 4 of the region of the external surface 11', 21' of the rope visible from both cameras is searched, and for each point of the axis of the first rectified image 14' the point of the axis of the second rectified image 24' belonging to the same epipolar line is searched;

g3) a first set of pairs of corresponding points belonging to the contour lines of the rope, a second set of pairs of corresponding points belonging to the contour lines of the rope and a third set of pairs of corresponding points belonging to the axes of the rectified images are obtained. Corresponding points thus means homologous points or points belonging to the same epipolar line. Since all the points belonging to the axes of the rectified images also belong to the axes of symmetry of the images of the rope, seen on a plane passing through the foci of each of the cameras of the pair of cameras, such points belonging to the image axes represent the projections of points belonging to the rope axis, as shown in FIG. 11.

Preferably, therefore, by means of the projection matrices from the three-dimensional space-rectified planes, the sets of the pairs of corresponding points belonging to the contour lines of the rope or cable and belonging to the axes of the rectified images in the three-dimensional space are back-projected, obtaining the three-dimensional representation of the points of the contour lines and the axis of the rope or cable referring with respect to a three-dimensional space.

In an alternative embodiment of the method, four cameras are included which form at least six independent pairs of cameras, in which each pair of cameras detects a respective pair of digital images and in which at least one of the two images acquired by a first pair of cameras is different from at least one of the two images acquired by a second pair of cameras.

In another embodiment of the invention, for example, the linearity of the axis of the rope or cable is measured, preferably by means of a calibrated three-dimensional optical measuring apparatus 1 described above, performing in addition to the steps for reconstructing the plurality of 3D midpoints 32' representative of the points of the rope axis, the following further steps:

interpolating the plurality of 3D midpoints 32' with an interpolating curve 90;

calculating the distance between the interpolated 3D axis 33' and a 3D midpoint 32' belonging to the interpolating curve 90.

In a further embodiment of the method, the interpolating curve is sampled to obtain a plurality of sampled 3D midpoints and an ideal 3D mean axis 35 is calculated as a regression line which best approximates said plurality of sampled 3D midpoints and then the distance 38 between the ideal 3D mean axis 35 and a sampled 3D midpoint 37 of said plurality of sampled 3D midpoints is calculated.

For example, the interpolating curve is any geometric curve, or for example, it is a linear curve in sections obtained by means of 3D interpolation of the 3D midpoints.

Preferably, the distance 38 between the ideal 3D mean axis 35 and a sampled 3D midpoint 37 of said plurality of sampled 3D midpoints is calculated as the length of the line joining the sampled 3D midpoint 37 and an intersection point between a plane perpendicular to the ideal 3D mean axis and passing through the sampled 3D midpoint and the ideal 3D mean axis.

In a further embodiment of the method, the pitch of the helix or coils of the rope is also measured, for example in the case where the rope is provided with strands or has a spiral or helical outer surface. Preferably, in addition to steps a1), b1), c1) and c2) or in addition to steps a1) to g1) and c2) described in the previous paragraphs, with which the first mean axis 14 and the second mean axis 24 are calculated, further steps are included for:

a4) identifying separation lines 100, 102, 104, on the first 10' and on the second 20' digital image of said first 11' and said second 21' regions of the outer surface of the rope, in which the separation lines 100, 102, 104 delimit contiguous areas 101, 103 of the first 10' and second 20' digital images which follow each other along a substantially parallel direction with respect to the first 14 or second 24 mean axis and cross the first 14 or second 24 mean axis from the first sub-area 13a, 23a to the second sub-area 13b, 23b;

b4) identifying an intersection point 200, 300 between the separation lines 100, 102, 104 and the first 14 and/or second 24 mean axes;

c4) searching for a homologous intersection point 200a 300a, so that said homologous intersection point 200a, 300a represents a homologous point of said intersection point 200, 300 and that said intersection point 200, 300 and homologous intersection point 200a, 300a each represent the images of a point common to the first 11 and to the second 21 region of the outer surface of the rope;

d4) photogrammetrically back-projecting the intersection point 200, 300 and the homologous intersection point 200a, 300a in a three-dimensional space 40, so as to obtain a 3D intersection point 210, 310 referring to the three-dimensional space 40;

e4) repeating steps a4) to d4) a plurality of times until obtaining the three-dimensional representation of a plurality of 3D intersection points 210, 211, 310 belonging to the first 11' and to the second 21' region of the outer surface of the rope;

f4) calculating a distance between at least a first 3D intersection point 210 and at least a second 3D intersection point 211, said second 3D intersection point 211 being relatively adjacent to the first 3D intersection point 210. Preferably, said distance calculated in step f4) described above is said pitch of the coil or helix of the rope or cable.

Preferably, the distance between the first 3D intersection point 210 and the second 3D intersection point 211 is defined as the pitch of the helix or spiral.

To obtain the three-dimensional representation of the plurality of 3D intersection points 210, 211, which allow to calculate the pitch of the coils, for example, it is also possible to proceed by means of a step in which projection matrices from the three-dimensional space-rectified planes as already described for the contour lines of the rope are used, obtaining the three-dimensional representation of the 3D intersection points of the contour lines referring to a three-dimensional space.

In a further embodiment of the method, a further step is included in which statistical variables (mean, variance, percentiles . . . ) are calculated on the population of the distances (pitches) between the first 3D intersection points 210 and the second 3D intersection points 211, for example, the mean pitch is obtained as the mean of the distances between the first 3D intersection points 210 and the second 3D intersection points 211.

Preferably, in an embodiment of the invention, the digital image is a rectified image, according to the known image rectification techniques in photogrammetry. For example, the image acquired by a camera is subjected to rectification by means of a transformation process generally used to project multiple images onto a common two-dimensional surface, with a standard coordinate system, which modifies the perspective deformations of each image.

Preferably, the method according to the present invention is applied iteratively on portions of the rope 2 which are at least contiguous in sections along a direction H-H' parallel to a main dimension of the rope 2. Such a dimension can also have an indefinite length and such a method is consequently applied iteratively along said dimension of indefinite length.

Preferably, it is apparent that the method according to the present invention includes the simultaneous acquisition of at least two or more digital images, each acquired by a respective digital image acquisition device, of a portion of rope of predefined length. Therefore, it is not aimed at an acquisition of a single point or a single transversal line of the rope, but a portion of the rope extending for a predefined length along the rope axis is acquired.

Preferably, the method described in the preceding paragraphs can be directly loaded into the internal memory of a computer in the form of portions of software code adapted to implement the method according to what has been described up to now when the software is run on a computer.

As is evident, innovatively, the calibrated three-dimensional optical measuring apparatus and the three-dimensional optical measurement method according to the present invention allow to reconstruct three-dimensional measurements of ropes or cables or parts of ropes or cables which are stationary or moving and therefore to perform measurements and quality checks in a non-invasive and non-destructive manner on the rope or cable, with continuity along the entire length of the object, without an operator needing to perform manual measurements, without requiring stopping the movement of the rope or cable and in a precise and accurate manner.

In particular, the presence of an attachment device 4' adapted to constrain the three-dimensional optical measuring apparatus to the rope in a relatively translatable manner with respect to the rope 2 allows the entire apparatus to be moved, thus allowing to calculate the geometric 3D parameters while the apparatus is being moved along the rope. Together with the particular arrangement of the cameras, this is particularly advantageous as it prevents having to slide the rope and allows the apparatus to be used in a variety of situations in which the rope is fixed and the apparatus slides on the rope (for example for monitoring bridge ropes or supporting ropes of cableways or cables at high altitudes, and the like) or in which the apparatus is held fixed with respect to a reference on the ground and the rope slides relative to the apparatus (for example, for monitoring lifting ropes or hauling ropes of cable cars and the like).

Moreover, by virtue of the axial opening 28, the installation operation on the rope is simple and fast to obtain, allowing to further facilitate the mobile installation of the apparatus.

Furthermore, advantageously, by virtue of the presence of a lighting device arranged between a pair of adjacent image acquisition devices, it is possible to adequately illuminate the rope while ensuring adequate compactness of the apparatus and allowing to prevent possible reflections or artifacts, precisely thanks to such an arrangement intercalated between the lighting device and image acquisition devices.

Furthermore, by virtue of the particular arrangement of the digital image acquisition devices around the rope, as well as the lighting devices, it is possible to obtain an apparatus which is particularly compact and easy to transport, without losing measurement accuracy.

Furthermore, advantageously, providing a support structure 10 spaced apart from the casing 3 and joined only at a joining region 11, possibly provided with a dampening element, allows to limit any vibrations, preventing any vibrations towards the image acquisition devices during the movement of the apparatus with respect to the rope.

Furthermore, even more advantageously, the system allows to obtain the linearity of the axis of the rope or cable, the measurement of the diameter and roundness of an object approximating a rotating body and the measurement of the pitch of coils present on the surface of the rope or cable, starting only from the images of the outer surface of the object itself and for indefinite lengths, simply by making the rope relatively move with respect to the apparatus. For example, this is useful for the dimensional verification of ropes or cables of considerable length.

Furthermore, the apparatus is capable of automatically performing the measurements of the geometric parameters even in the presence of difficult environmental conditions from the point of view of the rope lighting, such as measurements in environments contaminated by fumes, gases, dusts, weathering. Furthermore, the system allows to perform measurements continuously and irrespective of the dimensions and the material forming the outer and inner surface of the rope.

Furthermore, being intrinsically calibrated, the apparatus does not require further calibration operations before each measurement, as however disadvantageously occurs for non-calibrated optical measuring systems.

Furthermore, the three-dimensional reconstruction of the plurality of contour 3D points, and therefore the three-dimensional measurement of the rope parameters, allows to overcome the problems of perspective localization between rope and camera, since the rope contours will always be reconstructed in a calibrated three-dimensional space and it is always possible to calculate the parameters regardless of the relative position between camera and rope during image acquisition.

Furthermore, advantageously the use of synchronized cameras, preferably with two-dimensional matrix image sensor, allows to acquire images of entire portions of rope at the same instant with subsequent photogrammetric reconstruction, reducing or even eliminating measurement errors due to any vibrations of the rope, around an axis perpendicular to the rope axis.

Furthermore, the use of cameras with a matrix sensor accompanied by a lighting device allows to acquire 2D images of a rope sample with a very short exposure time, minimizing any possibility of error due to the vibration of the rope, which would instead be encountered if linear sensors were used.

In order to meet contingent needs, it is apparent that those skilled in the art can make changes to the invention described above, all of which are contained within the scope of protection as defined in the following claims.

What is claimed is:

1. A calibrated three-dimensional optical measuring apparatus for three-dimensional measurement of geometric parameters of a rope, comprising:
   a frame defining and arranged around a rope receiving cavity;
   a plurality of image acquisition devices configured to acquire a multiplicity of digital images of at least one region of an outer surface of the rope, said image acquisition devices being fixed to the frame and arranged around the rope when the calibrated three-dimensional optical measuring apparatus receives the rope in the rope receiving cavity;
   an attachment device configured to constrain the calibrated three-dimensional optical measuring apparatus to the rope in a relatively translatable manner with respect to the rope; and
   an electronic digital image processing device, configured to process the multiplicity of digital images and to obtain a three-dimensional photogrammetric reconstruction of points of the digital images of the rope acquired by the image acquisition devices
   wherein the frame comprises a casing defining the rope receiving cavity and arranged around the rope receiving cavity and a support structure, joined to the casing, the image acquisition devices being fixed on said support structure, and wherein the support structure has an open annular shape, and the casing has a box-like shape, said casing being arranged around an interior or an exterior of the support structure.

2. The calibrated three-dimensional optical measuring apparatus of claim 1, wherein the electronic digital image processing device comprises a storage unit, in which intrinsic and extrinsic calibration parameters of each image acquisition device are stored.

3. The calibrated three-dimensional optical measuring apparatus of claim 1, wherein the support structure comprises a joining region releasably joined to the casing.

4. The calibrated three-dimensional optical measuring apparatus according to of claim 3, wherein the support structure is spaced apart from the casing in a remaining portion of the support structure, which is different from the joining region.

5. The calibrated three-dimensional optical measuring apparatus of claim 1, wherein a dampening element is interposed between the support structure and the casing, the dampening element being made of a material adapted to dampen transmission of vibrations from the casing to the support structure.

6. The calibrated three-dimensional optical measuring apparatus of claim 1, wherein the casing and the support structure are joined to form a single piece or part of a single piece.

7. The calibrated three-dimensional optical measuring apparatus of claim 1, wherein the support structure is arranged around the exterior of the casing and wherein the casing comprises a casing side wall extending between a head end and a tail end along an axial direction parallel to a main extension axis of the rope, said casing side wall being adapted to be arranged spaced apart from the rope when the calibrated three-dimensional optical measuring apparatus relatively slides with respect to the rope, at least one viewing window being formed on said casing side wall for each image acquisition device so that the image acquisition device detects a digital image of the rope through said at least one viewing window.

8. The calibrated three-dimensional optical measuring apparatus of claim 7, wherein the casing comprises a casing tail wall and a casing head wall, which close the casing side wall close to the tail end and the head end, respectively, and wherein at least one passage opening traversable by the rope, is formed on said casing head wall and casing tail wall, and wherein the casing tail wall and the casing head wall each comprise a first wall portion fixed to and integral with the casing side wall and a removable wall portion releasably fixed to the first wall portion, so that, in a rope insertion configuration, the removable wall portion is not fixed to the first wall portion to leave a rope insertion opening in the casing tail wall and/or in the casing head wall, said rope insertion opening communicating with the at least one passage opening to allow insertion of the rope in the at least one passage opening of a relative movement between the casing and the rope perpendicular to the axial direction (X'), and so that, in a rope installation configuration, the removable wall portion is fixed to the first wall portion to close the rope insertion opening.

9. The calibrated three-dimensional optical measuring apparatus of claim 8, wherein the removable wall portion at least partially defines the at least one passage opening.

10. The calibrated three-dimensional optical measuring apparatus of claim 8, wherein the first wall portion comprises at least one sliding guide in which the removable wall portion is slidably engaged to switch from an extracted configuration, in which the rope insertion opening is exposed, to an inserted configuration, in which the removable wall portion closes the rope insertion opening.

11. The calibrated three-dimensional optical measuring apparatus of claim 8, wherein, close to the at least one passage opening, the calibrated three-dimensional optical measuring apparatus comprises a shielding wall projecting from the casing head wall or from the casing tail wall and extending internally towards the rope receiving cavity to shield at least partially entrance of light from outside the casing towards the rope receiving cavity.

12. The calibrated three-dimensional optical measuring apparatus of claim 7, wherein the casing side wall comprises a fixed portion defining an axial opening extending mainly along the axial direction between the head end and the tail end, and a movable portion, adapted to take a closed configuration, in which the movable portion closes the axial opening, and an open configuration, in which the movable portion allows accessing the axial opening, said axial opening being traversable by the rope during a relative movement between the casing and the rope perpendicular to the axial direction.

13. The calibrated three-dimensional optical measuring apparatus of claim 7, wherein a material adapted to absorb light electromagnetic radiation and reduce reflections is arranged on an inner surface of the casing side wall, facing the rope receiving cavity.

14. The calibrated three-dimensional optical measuring apparatus of claim 1, further comprising at least one lighting device configured to illuminate at least one region of the rope.

15. The calibrated three-dimensional optical measuring apparatus of claim 14, wherein, having defined a circumferential direction running around a main extension axis of the rope and lying on a plane incident or perpendicular to the main extension axis of the rope, the image acquisition devices are arranged on the frame circumferentially spaced apart from one another along said circumferential direction, and wherein the at least one lighting adapted configured to illuminate at least one region of the rope is arranged along the circumferential direction between a pair of adjacent image acquisition devices.

16. The calibrated three-dimensional optical measuring apparatus of claim 15, wherein the image acquisition devices comprise at least a first pair of image acquisition devices and a second pair of image acquisition devices, wherein the image acquisition devices of the first pair are arranged in a diametrically opposite manner and the image acquisition devices of the second pair are arranged in a diametrically opposite manner and are aligned along a perpendicular direction with respect to an alignment direction of the image acquisition devices of the first pair, and wherein the at least one lighting device is interposed between the first and second pairs of image acquisition devices along the circumferential direction, and circumferentially spaced apart from the image acquisition devices.

17. The calibrated three-dimensional optical measuring apparatus of claim 14, wherein the at least one lighting device projects an illuminating beam having an opening cone with a vertex angle to prevent the illuminating beam from intercepting a vision cone of each image acquisition device at least for a predefined distance, said predefined distance being calculated as a distance starting from an image sensor plane of an image acquisition device and along a direction perpendicular to said image sensor plane and towards the rope receiving cavity.

18. A three-dimensional optical measurement method, for three-dimensional measurement of geometric parameters of a rope, comprising:
   a) providing a three-dimensional optical measuring apparatus comprising a plurality of image acquisition devices fixed to a frame and arranged around the rope, said three-dimensional optical measuring apparatus being constrained to the rope by an attachment device in a relatively translatable manner with respect to the rope;
   b) performing a relative movement between the rope and the three-dimensional optical measuring apparatus;
   c) during the relative movement, acquiring a multiplicity of digital images of at least one region of an outer surface of the rope; and
   e) processing the multiplicity of digital images by an electronic digital image processing device and obtaining a three-dimensional photogrammetric reconstruction of points of the digital images of the rope acquired by the image acquisition devices wherein the frame comprises a casing defining the rope receiving cavity and arranged around the rope receiving cavity and a support structure, joined to the casing, the image acquisition devices being fixed on said support structure, and wherein the support structure has an open annular shape, and the casing has a box-like shape, said casing being arranged around an interior or an exterior of the support structure.

* * * * *